(12) United States Patent
Calder et al.

(10) Patent No.: US 8,918,362 B2
(45) Date of Patent: Dec. 23, 2014

(54) REPLICATION PROCESSES IN A DISTRIBUTED STORAGE ENVIRONMENT

(75) Inventors: Bradley Gene Calder, Bellevue, WA (US); Niranjan Nilakantan, Redmond, WA (US); Shashwat Srivastav, Seattle, WA (US); Jiesheng Wu, Redmond, WA (US); Abdul Rafay Abbasi, Redmond, WA (US); Shane Mainali, Duvall, WA (US); Padmanabha Chakravarthy Uddaraju, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 771 days.

(21) Appl. No.: 13/113,718

(22) Filed: May 23, 2011

(65) Prior Publication Data

US 2012/0303581 A1   Nov. 29, 2012

(51) Int. Cl.
*G06F 17/00* (2006.01)
*G06F 7/00* (2006.01)
*G06F 17/30* (2006.01)

(52) U.S. Cl.
CPC ............................. *G06F 17/30575* (2013.01)
USPC .......................................... 707/610; 707/626

(58) Field of Classification Search
CPC .......... G06F 17/30575; G06F 11/1469; G06F 17/30333
USPC .............. 707/600–831, 899, 999.001–99.206
See application file for complete search history.

(56) References Cited

U.S. PATENT DOCUMENTS

| | | | |
|---|---|---|---|
| 6,163,856 A | 12/2000 | Dion et al. | |
| 6,978,396 B2 | 12/2005 | Ruuth et al. | |
| 7,657,718 B1 | 2/2010 | LeCrone et al. | |
| 7,809,892 B1 | 10/2010 | Chatterjee et al. | |
| 8,627,135 B2* | 1/2014 | Aron et al. | 714/4.11 |
| 2008/0243951 A1 | 10/2008 | Webman et al. | |
| 2008/0256138 A1* | 10/2008 | Sim-Tang | 707/202 |
| 2008/0275891 A1* | 11/2008 | Park et al. | 707/100 |
| 2009/0077011 A1* | 3/2009 | Natarajan et al. | 707/2 |
| 2010/0198788 A1* | 8/2010 | Sim-Tang | 707/634 |
| 2012/0042196 A1* | 2/2012 | Aron et al. | 714/4.11 |

OTHER PUBLICATIONS

U.S. Appl. No. 13/113,702, applicant Bradley Gene Calder, titled "Synchronous Replication in a Distributed Storage Environment" filed May 23, 2011, 62 pages.

(Continued)

*Primary Examiner* — Angelica Ruiz
(74) *Attorney, Agent, or Firm* — Ben Tabor; David Andrews; Micky Minhas

(57) ABSTRACT

Embodiments of the present invention relate to systems, methods, and computer storage media for replicating data in a distributed computing environment utilizing a combination of replication methodologies. A full-object replication may be utilized to replicate a full state of an object from a primary data store to a secondary data store. A checkpoint created after initiating the full-object replication may be parsed to identify changes to the object that have been entered since initiating the full-object replication. This replication process is referred to as a delta-checkpoint replication methodology. Additionally, in an embodiment, a log-based replication methodology may be utilized. The log-based replication may communicate data from a log of the primary data store to the secondary data store. It is also contemplated in an exemplary embodiment that when the log-based replication fails to maintain a throughput threshold, one of the other replication methodologies may be initiated, at least temporarily.

20 Claims, 9 Drawing Sheets

(56) References Cited

OTHER PUBLICATIONS

U.S. Appl. No. 13/113,795, applicant Bradley Gene Calder, titled "Implementing Failover Processes Between Storage Stamps" filed May 23, 2011, 80 pages.

U.S. Appl. No. 13/113,634, applicant Bradley Gene Calder, titled "Geo-Verification and Repair" filed May 23, 2011, 30 pages.

U.S. Appl. No. 13/113,729, applicant Bradley Gene Calder, titled "Versioned and Hierarchical Data Structures and Distributed Transactions" filed May 23, 2011, 25 pages.

U.S. Appl. No. 13/113,808, applicant Bradley Gene Calder, titled "Storage Account Migration Between Storage Stamps" filed May 23, 2011, 68 pages.

U.S. Appl. No. 13/113,776, applicant Bradley Gene Calder, titled "Load Balancing When Replicating Account Data" filed May 23, 2011, 58 pages.

U.S. Appl. No. 13/113,688, applicant Bradley Gene Calder, titled "Asynchronous Replication in a Distributed Storage Environment" filed May 23, 2011, 52 pages.

"How can a database be in-memory and durable at the same time", Retrieved on: Dec. 30, 2010, 4 pages Available at: http://www.clusterdb.com/mysql-cluster/how-can-a-database-be-in-memory-and-durable-at-the-same-time/.

Randal, Paul S., "High Availability with SQL Server 2008", Retrieved on: Dec. 30, 2010, 27 pages Available at: http://msdn.microsoft.com/en-us/library/ee523927.aspx.

"Yahoo!'s 0047eo-Replication Service, PNUTS", Retrieved on: Dec. 31, 2010, 4 pages Available at: http://idleprocess.wordpress.com/2009/08/09/yahoos-geo-replication-service-pnuts/.

Kosacek, et al., "Building Highly Available Microsoft Clusters with Replicated Storage", Retrieved on: Dec. 30, 2010, 4 pages Available at: http://ftp.dell.com/app/ps-kosac.pdf.

* cited by examiner

REPLICATION PROCESSES IN A DISTRIBUTED STORAGE ENVIRONMENT

BACKGROUND

Data in a distributed computing environment may be replicated to a remote secondary location from a primary location. Therefore, the data is replicated from a source to a destination in the event that the source loses data due to a disaster or otherwise unavailable to serve the data. When data is updated at the primary, there is a desire for the secondary to eventually reflect the changes to the data. However, merely recopying all of the data even for a minor change to the data from the primary to the secondary may consume a lot of resources. Similarly, merely communicating the changes to the data as they occur may be inflexible to account for resistance or other barriers to a seamless communication of data between the primary and the secondary locations.

SUMMARY

Embodiments of the present invention relate to systems, methods, and computer storage media for replicating data in a distributed computing environment utilizing a combination of replication methodologies. A full-object replication may be utilized for an initial replication of an object from a primary data store to a secondary data store. During the full-object replication, additional changes to the object may be committed by the primary data store and memorialized in a checkpoint that is intended to be utilized to restore the primary data store in the event of a failure to the primary data store. This checkpoint may be parsed to identify changes to the object that have been entered since initiating the full-object replication. The utilization of a subsequent checkpoint may be referred to as a delta-checkpoint replication methodology. Additionally, in an embodiment, a log-based replication methodology may be utilized. The log-based replication may communicate data from a log of the primary data store to the secondary data store for the data to be replicated at the secondary data store. It is also contemplated in an exemplary embodiment that if the log-based replication is failing to maintain a throughput threshold, one of the other replication methodologies may be initiated, at least temporarily.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
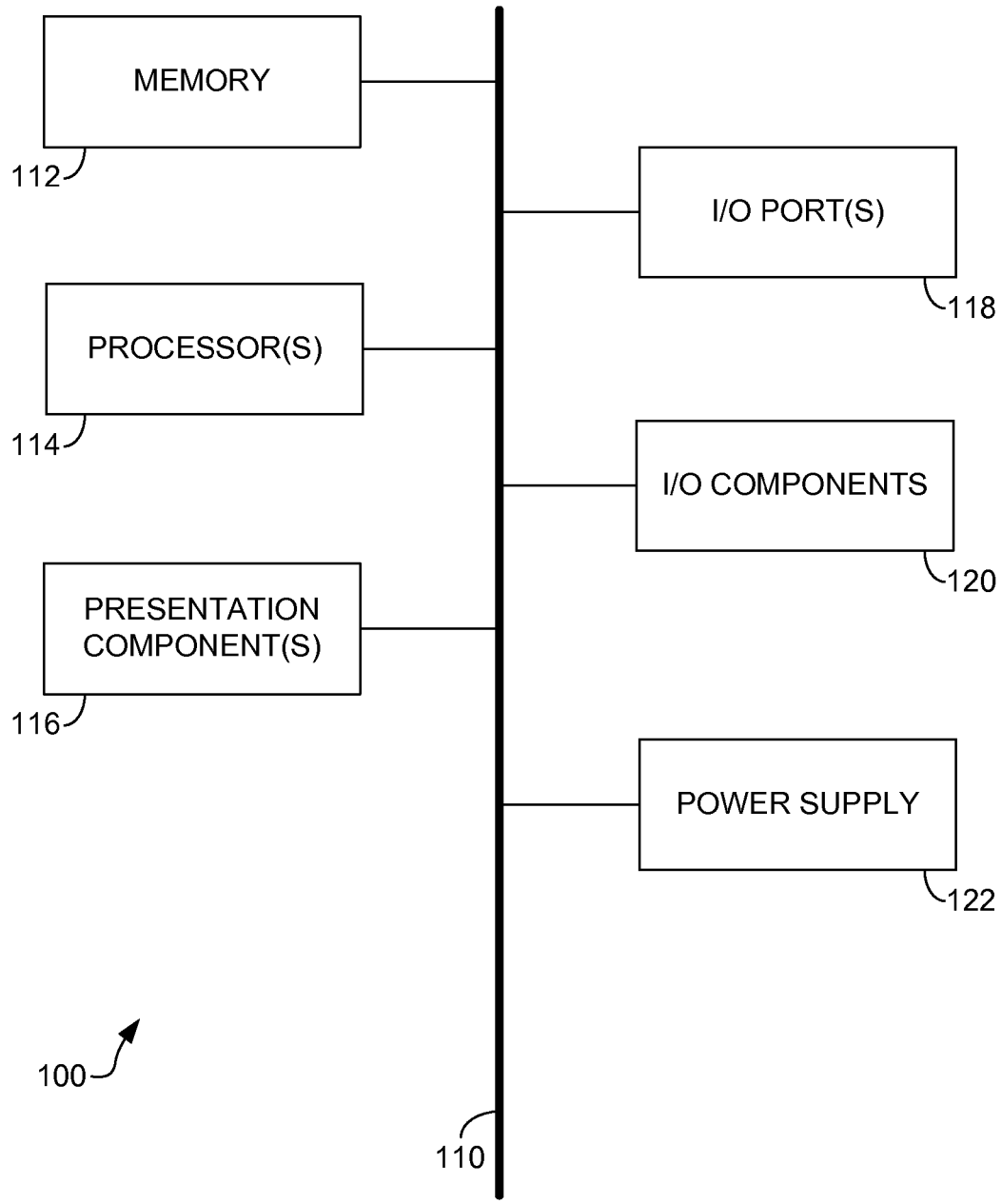
FIG. 1 depicts an exemplary computing device suitable for implementing embodiments of the present invention.

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies.

Embodiments of the present invention relate to systems, methods, and computer storage media for replicating data in a distributed computing environment utilizing a combination of replication methodologies. A full-object replication may be utilized for an initial replication of an object from a primary data store to a secondary data store. During the full-object replication, additional changes to the object may be committed by the primary data store and memorialized in a checkpoint that represents the updates to the data objects in the data store. This checkpoint may be parsed to identify changes to the object that have been entered since initiating the full-object replication, and they are traversed to serve up the contents to these objects when accessed by the client. The utilization of a subsequent checkpoint may be referred to as a delta-checkpoint replication methodology. Additionally, in an embodiment, a log-based replication methodology may be utilized. The log-based replication may communicate data from a log of the primary data store to the secondary data store for the data to be replicated at the secondary data store. It is also contemplated in an exemplary embodiment that if the log-based replication is failing to maintain a throughput threshold, one of the other replication methodologies may be initiated, at least temporarily.

Accordingly, in one aspect, the present invention provides a computer-implemented method in a distributed computing environment utilizing a processor and memory for replicating data utilizing a combination of replication processes in the distributed computing environment. The method includes identifying a first checkpoint for a data partition range at a primary data store. The data partition range maintains data to be replicated at a secondary data store. The method also includes replicating the first checkpoint to the secondary data store utilizing a full-object replication process. The method is further comprised of identifying a second checkpoint for the data partition range at the primary data store. The method includes initiating replicating the second checkpoint to the secondary data store utilizing a delta-checkpoint replication process. The method also includes initiating replicating data from the data partition range at the primary data store to the secondary data store utilizing a log-based replication process.

In another aspect, the present invention provides computer storage media having computer-executable instructions embodied thereon, that when executed by a computing system having a processor and memory, cause the computing system to perform a method for replicating data in a distributed computing environment utilizing a plurality of replication processes. The method includes initiating replicating data from a primary data store to a secondary data store utilizing a log-based replication process. The data is maintained in a log of the primary data store. The method also includes determining the log-based replication process is performing below a predefined threshold of replication throughput from the primary data store to the secondary data store. After determining the log-based replication process is below the predefined threshold, initiating replicating data from the primary data store to the secondary data store utilizing a checkpoint replication process.

A third aspect of the present invention provides computer storage media having computer-executable instructions embodied thereon, that when executed by a computing system having a processor and memory, cause the computing system to perform a method for replicating data in a distributed computing environment utilizing a plurality of replication processes. The method includes replicating a first data from a primary data store to a secondary data store utilizing a full-object replication process based on a first checkpoint. The full-object replication replicates a full state of the object. The method also includes replicating a second data from the primary data store to the secondary data store utilizing a delta-checkpoint replication process based on a second checkpoint. The delta-checkpoint replication process replicates delta differences of the first object. In this example, the second checkpoint was generated after the full-object replication process initiated replicating the first data. The method also includes replicating a third data from the primary data store to the secondary data store utilizing a log-based replication process. The log-based replication process replicates the third data from a log of the primary data store. In this example, the third data is not maintained in the first checkpoint or the second checkpoint.

Having briefly described an overview of embodiments of the present invention, an exemplary operating environment suitable for implementing embodiments hereof is described below.

Referring to the drawings in general, and initially to FIG. 1 in particular, an exemplary operating environment suitable for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of modules/components illustrated.

Embodiments may be described in the general context of computer code or machine-useable instructions, including computer-executable instructions such as program modules, being executed by a computer or other machine, such as a personal data assistant or other handheld device. Generally, program modules including routines, programs, objects, modules, data structures, and the like, refer to code that performs particular tasks or implements particular abstract data types. Embodiments may be practiced in a variety of system configurations, including hand-held devices, consumer electronics, general-purpose computers, specialty computing devices, servers, routing devices, distributed computing devices, etc. Embodiments may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation modules 116, input/output (I/O) ports 118, I/O modules 120, and an illustrative power supply 122. Bus 110 represents what may be one or more busses (such as an address bus, data bus, or combination thereof). Although the various blocks of FIG. 1 are shown with lines for the sake of clarity, in reality, delineating various modules is not so clear. For example, one may consider a presentation module such as a display device to be an I/O module. Also, processors have memory. The inventors hereof recognize that such is the nature of the art, and reiterate that the diagram of FIG. 1 is merely illustrative of an exemplary computing device that can be used in connection with one or more embodiments. Distinction is not made between such categories as "workstation," "server," "laptop," "hand-held device," "server," "data store" etc., as all are contemplated within the scope of FIG. 1 and reference to "computer" or "computing device."

Computing device 100 typically includes a variety of computer-readable media. By way of example, and not limitation, computer-readable media may comprise the following non-transitory computer-storage media: Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, or any other medium that can be used to encode desired information and be accessed by computing device 100. In an exemplary embodiment, the computer-readable media is a non-transitory media.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O modules 120. Presentation module(s) 116 present data indications to a user or other device. Exemplary presentation modules include a display device, speaker, printing module, vibrating module, and the like. I/O ports 118 allow computing device 100 to be logically coupled to other devices including I/O modules 120, some of which may be built in. Illustrative modules include a microphone, joystick, game pad, satellite dish, scanner, printer, wireless device, and the like. It is understood that the computing device 100 may be manifested in a variety of forms. For example, portions of the computing device 100 may be physically located in a first geographic location while other portions may be physically located in a different geographical location. Consequently, it is contemplated that various devices, services, applications, and layers may be distributed across a variety of locations while still achieving the desired results traditionally applicable to the computing device 100.

Figure 2:
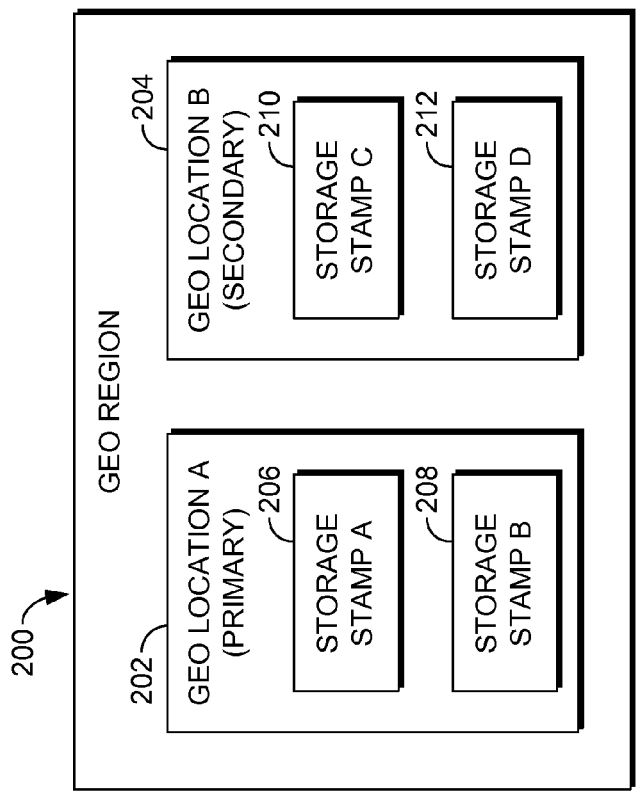
FIG. 2 depicts a block diagram illustrating an exemplary geographical region within a distributed computing environment, in accordance with embodiments of the present invention.

With reference to FIG. 2, a block diagram is provided illustrating an exemplary geographical region ("geo region") 200, in accordance with embodiment of the present invention. In general, a geo region is a collection of geographical locations grouped together by a political and/or governmental boundary. For example, a geo region may include the United States, a second geo region may include Europe, and a third geo region may include Asia-Pacific regions.

As will be discussed in greater detail hereinafter, a client may desire to replicate data within a particular geo region, but at different geographical location within the geo region. For example, a client may desire to maintain all of their data within the United States of America (as opposed to replicating the data in a different geo region) to be subjected to the laws governing the United States of America. But, because of a business continuity plan (disaster recovery plan), the client may require the data to be replicated in different geographical locations ("geo location") (to be discussed hereinafter) within the United States. As a result, the data may be accessed through a geo location A 202, which may be in a first geographic location. The data may then also be replicated in a second geo location B 204, which is geographically different from the geo location A 206.

A geo location is a geographical location that holds one or more storage stamps (to be discussed hereinafter). Examples of a geo location include a Seattle, Wash., USA-based grouping of storage stamps as a first geo location and a Des Moines, Iowa, USA-based grouping of storage stamps as a second geo location. Because of the substantial physical distance between Seattle and Des Moines, should a natural disaster or other business interfering activity occur in Seattle, Des Moines may be insulated from the effects of that activity.

A storage stamp (also referred to as a "data store" herein) is a collection of physical drives or other computer-readable memory, which may be coupled to one or more processors. For example, a storage stamp may be comprised a cluster of 10-20 racks of storage that maintains 2 to 20 petabytes of storage. It is contemplated that a storage stamp has greater or less storage capacity. Storage stamps associated with a common geo location may be geographically close in proximity (e.g., within a common data center). As a result of the relatively close proximity to one another, a high level of connectivity is generally present between storage stamps of a common geo location. However, because storage stamps are generally in close proximity to one another in a common geo location, an incident that causes the loss of connectivity of one storage stamp (e.g., natural disaster) may likely affect another storage stamp within that same geo location.

Therefore, it is an aspect of the present invention to allow for the replication of data between two or more storage stamps that may be geographically separate from one another. Consequently, it is contemplated that data maintained in a first storage stamp in a first geo location is replicated to a second storage stamp in a second geo location, such that the second geo location and the first geo location are geographically separated by a sufficient distance (e.g., 100 miles, 1,000 miles, 10,000 miles, 12,500 miles, etc.). It is contemplated that the second storage stamp is within the same geo region as the first storage stamp. Conversely, it is also contemplated that the second storage stamp is in a different geo location than the first storage stamp.

Returning to FIG. 2, the geo location A 202 and the geo location B 204 are located within the common geo region 200 (in this non-limiting example). The geo location A 202 is comprised of a storage stamp 206 and a storage stamp 208. Similarly, the second geo location B 204 is comprised of a storage stamp C 210 and a storage stamp D 212. As indicated previously, it is contemplated that a geo location may have any number of storage stamps of any size.

Embodiments of the present invention contemplate having a primary geo location and a secondary geo location where data is stored for a given account, or portions of an account. A customer associated with an account may, in an exemplary embodiment, select a primary geo location (e.g., geo location A 202). Further, it is contemplated that a secondary geo location (e.g., geo location B 204) is selected for the customer based on a number of criteria, either provided by the customer or based on reliability, redundancy, and/or availability measures. However, it is also contemplated that either the primary geo location and/or the secondary geo location are selected by the customer or selected for the customer.

Figure 3:
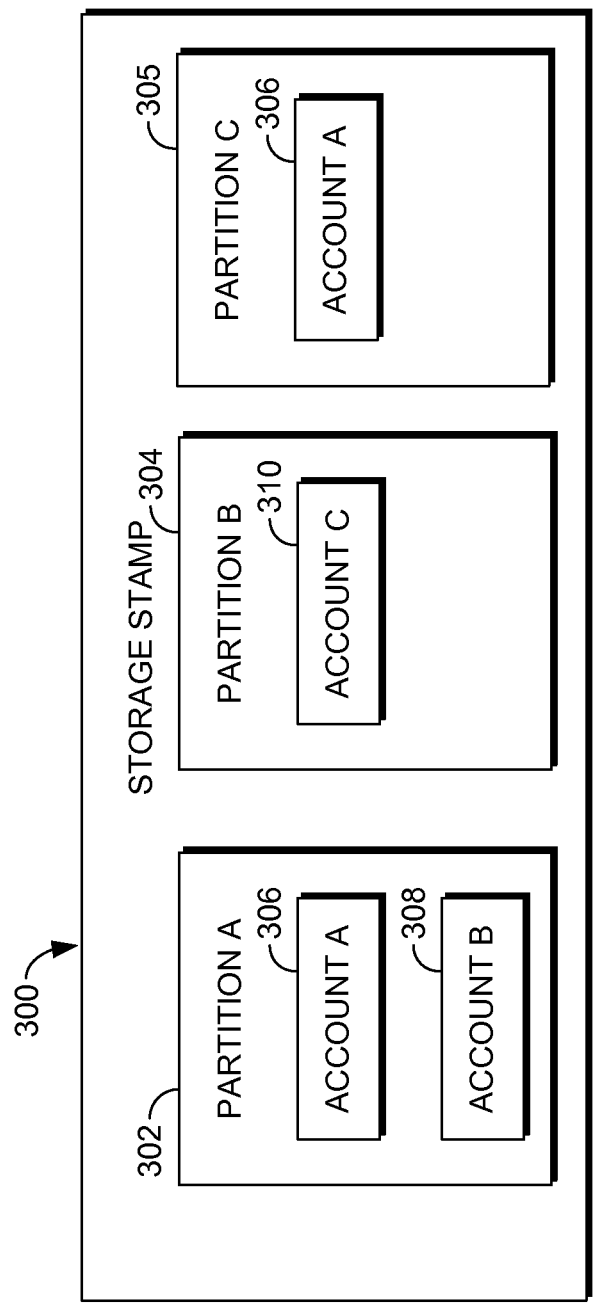
FIG. 3 depicts a block diagram of an exemplary storage stamp, in accordance with embodiments of the present invention.

Turning to FIG. 3, which illustrates a block diagram of an exemplary storage stamp 300, in accordance with embodiments of the present invention. The storage stamp 300, in an exemplary embodiment, may be located within the geo location A 202 of FIG. 2, previously discussed. A storage stamp may be comprised of a number of partitions. A partition is a subset of the storage capacity for a given storage stamp. Therefore, data stored to a storage stamp may be identified, at least in part, based on a partition identifier of a partition that stores the data. In an exemplary embodiment, partitions may be utilized to manage one or more accounts utilizing a storage stamp. However, it is contemplated that an account may utilize two or more partitions (as will be discussed hereinafter).

The storage stamp 300 is depicted as having a partition A 302, a partition B 304, and a partition C 306. The partition A 302, in this example, maintains data associated with an account A 306 and an account B 308. The partition B 304 maintains data associated with an account C 310. The partition C 305 also includes the account A 306. In an exemplary embodiment, the account A 306 is spread across multiple partitions, such as partition A 302 and partition C 305. It is understood that any number of accounts and any number of partitions may be provided in the above example, and the illustration is provided for explanation purposes.

Geo replication of data is contemplated as occurring at a number of different levels within a distributed computing environment. For example, it is contemplated that data stored on a given storage stamp is geo replicated to another storage stamp. Similarly, it is contemplated that data associated with a particular account is geo replicated. Further, it is contemplated that data maintained in a particular partition is geo replicated. Geo replication is therefore contemplated as being able to be performed at any level of granularity within the system.

In an exemplary embodiment, it is contemplated that geo replication occurs at the account level such that an account will have a primary geo location and one or more secondary geo locations assigned thereto. Geo replication at the account level may be important to allow the geo failover for a specific storage account that wants to migrate from one geo location to another geo location. Additionally, geo replication at the account level may allow a customer to turn on or turn off geo replication for a particular account to save resources (e.g., space, money). Further, it is contemplated that replication (e.g., geo replication) may be turned on or off for a portion of data associated with an account.

Figure 4:
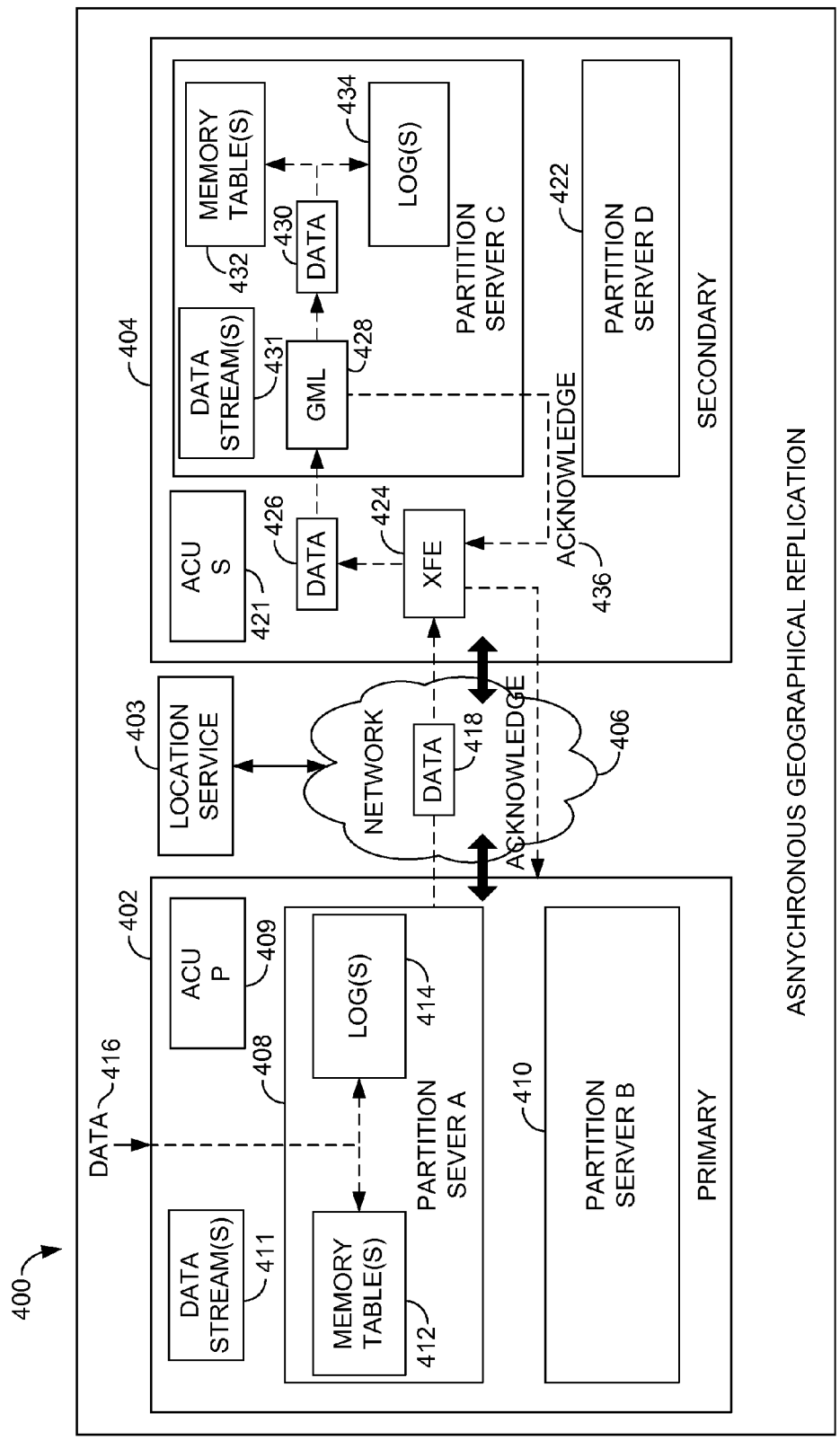
FIG. 4 depicts a block diagram of an exemplary system for geo replication of data, in accordance with embodiments of the present invention.

Turning to FIG. 4 illustrating a block diagram of an exemplary system 400 for geo replication of data, in accordance with embodiments of the present invention. The system 400 is comprised of a primary data store 402 and a secondary data store 404. The primary storage stamp is comprised of a plurality of partitions, such as a partition server A 408 and a partition server B 410. The partition server A 408, in this example, is comprised of a memory table 412 and a log 414.

In an exemplary embodiment, a partition server may be comprised of a plurality of memory tables and/or a plurality of logs. For example, a partition may be comprised of an update log, a block log, a page log, a geo message log, and/or checkpoint streams. In an exemplary embodiment, a log is located within a stream layer of a distributed computing environment such that the log is a discrete data stream that is append only.

The checkpoint streams are data streams used for checkpoint replication. The memory tables are written into checkpoints in the data stream to persist the data, which allows the logs to be truncated. The memory table represents the aggregated results of the logs only held in memory, so when the memory table is checkpointed into the data stream, the part of the logs up to the checkpoint can be freed, if they are no longer needed for geo-replication.

These checkpoints are what the contents of the memory table where at the time the memory table was checkpointed and then freed from memory. At that point those changes are then accessible from the checkpoints in the data stream.

A log stream may be relied upon to re-establish data of a storage stamp following a failure of a portion of a storage stamp (e.g., a storage node). For example, data may be committed to a storage stamp at a particular partition, but following the failure of the partition, the state of the partition is recreated, at least in part, by replaying one or more logs associated with that partition. Data may not be "committed" to a particular storage stamp until it is replayed (e.g., written into) one or more logs of the storage stamp. A distinction, in an exemplary embodiment, exists between data that is merely stored or written to a data stamp and data that is committed to the data stamp. For example, data may be written to a log of a storage stamp, but that data is not accessible to a client until the data is committed to the storage stamp. Committal of the data from a log, in an exemplary embodiment, may occur by the playing (or replaying) of the data from the log in order, which may not be strictly sequential, but instead merely in order.

As will be discussed hereinafter in more detail, data may be received in a non-sequential manner. However, it may be desired to commit the data in a sequential manner. In an exemplary embodiment, it may be desired to maintain the non-sequentially received data in a log until a portion of the data can be committed to the storage stamp in a sequential manner.

Returning to FIG. 4, the system 400 is comprised of a network 406. The various components of system 400 may communicate with each other via the network 406, which may include, without limitation, one or more local area networks (LANs) and/or wide area networks (WANs). Such networking environments are commonplace in offices, enterprise-wide computer networks, intranets, and the Internet. For example, in a distributed computing environment, it is common to allow for the communication of disparate components through a network. As such, the network 406 is not discussed in greater detail herein.

The secondary data store 404 is comprised of an XFE 424 (also referred to as a front end), a partition server C 420, and a partition server D 422. The partition server C 420, in this example, is comprised of a GML 428 (also referred to as a geo message log), a memory table 432, and a log 434. As previously discussed with respect to the partition server A 408, it is contemplated that one or more memory tables, one or more logs, and/or one or more checkpoint data streams may be utilized in a given partition. These data streams (e.g., data stream(s) 411 and 431) may hold the final committed data from the checkpointed memory tables The XFE 424 is a front end service for a given stamp. Among other functions that an XFE is configured to handle, the XFE processes an incoming geo message, a message passed from one storage stamp to another storage stamp for geo replication purposes, to ensure the data received by the XFE is intended to be committed to an associated storage stamp. An XFE may also inspect transactions present in a geo message to identify a particular partition within the storage stamp to which the data is to be committed. An XFE may also be responsible for forwarding a geo message onto an appropriate partition and/or log, receiving acknowledgments of storing/committal of data, and/or providing an acknowledgment to one or more senders of the data as to the status of the data.

The GML 428 is a geo message log. In an exemplary embodiment, a geo message is written almost immediately, upon receipt at a secondary data stamp, in a GML. This near immediate writing of the geo message may allow for the secondary data store to provide an acknowledgement back to a supplying primary data store that the data has been written durably (but may not have yet been committed) at the secondary data store. In this example, the primary does not have to wait for the re-execution of some of the geo-transactions (e.g. portions of the geo message) on the secondary data store for success to come back. Consequently, the geo message is written to the GML, and then replayed a later time.

This process of utilizing the GML may decouple the primary data store from the secondary data store because the primary data store will not have its sending of geo messages blocked if there is a delay in replaying of the geo message on the secondary data store. In an exemplary embodiment, this may be important because if the primary is blocked, then it could start to backup. However, when the secondary data store is keeping up with the primary data store, the geo messages may be replayed directly from memory without having to use or, at least, read back from the GML.

It is contemplated that a GML may be bypassed completely in an exemplary embodiment. Instead, incoming geo messages may be written directly to one or more logs of the partition that directly support committing of data to the partition (or a check pointing process).

An exemplary flow of data to be geo replicated is illustrated with FIG. 4. For example, data 416 is received at the primary data store 402. In this example, the data 416 may be from a client (e.g., an application, a service, a program, etc.). Depending on if the data 416 is associated with an account, in this example, that requires asynchronous, synchronous with eventual consistency, or synchronous with strong consistency methodologies, the flow may be altered. However, for purposes of a general discussion, an asynchronous methodology is illustrated with FIG. 4. It is understood that the flow of data may be altered for other types or configurations of geo replication.

An account control unit ("ACU") may be configured to identify what accounts and what information within an account is intended to be geo replicated and how it is intended to be geo replicated. For example, an ACU may be told that a given account desires replication and configures the partition 306 that holds that accounts data with the information (e.g., what the secondary stamp is to replicate the data to) to perform that geo replication. Then the partition server 408 may inspect the data 416 at the primary data store 402 to determine that the data 416 is associated with an account that desires asynchronous geo replication (for example). Each data stamp may have an ACU to control accounts at that stamp. For example, the Primary 402 has an ACU P 409, while the secondary has an ACU S 421. In an exemplary embodiment, an ACU does not look at any of the data. Instead, the ACU is just in charge of the configuration and coordination of the geo-replication. Consequently, each partition is responsible for doing the replication for the corresponding key range.

In an exemplary embodiment, the ACU is a service running at each stamp. The ACU may be responsible for executing a sequence of operations at each storage stamp to perform replication processes. For example, the ACU may be responsible for turning replication on and off for an account at an associated storage stamp. As will be discussed hereinafter, a location service 403 may communicate with an ACU to issue high-level directives for various replication processes. For example, the ACU may communicate with a partition master to execute various operations, such as partition splitting, merging, and replicating. The ACU may also receive other commands from the location service, such as a migration initialization command, a bootstrap command, or other replication oriented commands. An ACU may also track the progress of each command being performed on an account. The location service may then retrieve or receive updates from the ACU as to how the various stamps are progressing with their commands.

The location service 403, as indicated above, may be responsible for controlling high-level functions of replication. For example, a location service may maintain replication and migration assignments (e.g., what stamp is a primary and what stamp is a secondary for a given account). The location service may also serve as the highest authority in control of account replication. The location service, which may be computing device or a set of processes running in a computing environment, may be responsible for adding replication and migration states for storage accounts that are replicating/migrating between stamps.

In an exemplary embodiment, the location service 403 performs all storage account create, delete, and update transactions for all storage stamps that are a primary and/or a secondary for a given account. In this example, the location service 403 is able to maintain storage account information consistent across different stamps for the storage account, which may include create/delete account, change account permissions, and updating the account key for changing a domain name of an account. Further, the location service may communicate with a front end (e.g., XFE 424) and/or an ACU (e.g., ACU S 421) at a stamp to control and monitor operations at the stamp(s) for replication processes. Therefore, the location service 403 may be responsible for managing the overall process of replication while an ACU at each stamp may be responsible for communicating with the location service and controlling/monitoring performance of desired operations at a particular stamp.

As will be discussed hereinafter, the data 416 may be annotated with one or more records to facilitate replay of the data at the secondary data stamp (see later discussion of geo message annotated records). The annotated data, in this example, is data 418, which is communicated from the primary data store 402 to the secondary data store 404 by way of the network 406. The XFE 424 of the secondary data store 404 receives the data 418, which may be in the form of a geo message. The XFE 424 may then identify a transaction (e.g., portion within the data 418) that should be written to the GML 428 of the partition server C 420. For example, an account associated with the data 418 may be committed to the partition server C 420.

The portion of data communicated from the XFE 424 to the GML 428 is data 426. The data 426 may then be written (e.g., persisted) to the GML 428 for later committal to the partition server C 420. In this exemplary asynchronous geographical replication model, data replayed from the GML to be committed to the partition server C 420 is data 430. Data 430 may be a portion of data 426 or it may be a combination of a plurality of previously received data that are replayed in an ordered (e.g., sequential) manner for committal to the partition server C 420 through the entry of data 430 in the memory table 432 and/or the log 434. Further, it is contemplated that transactions (e.g., data) may be replayed out of order when the transactions replayed out of order are not dependent upon one another. This out-of-order replay allows for replay to occur at a faster rate. However, it is also contemplated that batch transactions, in an exemplary embodiment, requires the entire batch to be replayed or none of the batch to be replayed.

Returning to the GML 428. An acknowledgement 436 may be communicated from the GML 428 (or on behalf of the GML 428 by the partition server) to the XFE 424 indicating that the data 426 has been written to the GML 428. As a result, the XFE 424 (or on behalf of the XFE 424 by a service or control unit) communicates an acknowledgment 438 of the persistence of the data 416 (or data 418, or data 430) to the secondary data store 404. As will be discussed hereinafter, a commit ID may be updated, generated, and/or communicated from the primary data stamp as a result of receiving the acknowledgment 438.

In an exemplary embodiment, the data communicated from the primary data store 402 to the secondary data store 404 is in the form of a batched geo message. A batched geo message includes a number of transactions that may be destined for different partitions. The XFE 424 may identify the various transactions within a batched geo message and forward the appropriate transactions to the appropriate partitions, in this example. Continuing with this example, once the XFE 424 receives success from all of the partitions to which it sent transactions from the geo message, the XFE 424 may send the acknowledgment 438 to the primary data store 402 (or a particular primary that was a source of the geo message). At this point in the example, the data at the secondary data store 404 may not have been replayed from the GML 428 into one or more other logs (e.g., update log, blob log), which may occur later asynchronously. The primary data store 402 (or a source partition of the primary data store 402) may maintain the acknowledgements have been received back for a set of epoch # and/or sequence #'s (to be discussed hereinafter). Based on those acknowledgments received, the primary data store 402 determines if the commit ID can be advanced for inclusion with future geo messages.

The foregoing examples are provided to introduce concepts that will be discussed in greater detail hereinafter.

It should be understood that the arrangement illustrated in FIG. 4 and other arrangements described herein are set forth only as examples. Other arrangements and elements (e.g., machines, interfaces, functions, orders, and grouping of functions, etc.) can be used in addition to or instead of those shown, and some elements may be omitted altogether. Further many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Each of the components shown in FIG. 4 may be any type of computing device, such as computing device 100 described with reference to FIG. 1, for example. It should be understood that any number of data stores, partition servers, front ends, logs, data streams, networks, and/or memory tables may be employed within the system 400 within the scope of the present invention. Additionally other component not shown may also be included within the system 400.

Accordingly, any number of components may be employed to achieve the desired functionality within the scope of embodiments of the present invention. Although the various components of FIG. 4 are shown with lines for the sake of clarity, in reality, delineating various components is not so clear. Further, although some components of FIG. 4 are depicted as single blocks, the depictions are exemplary in nature and in number and are not to be construed as limiting.

Figure 5:
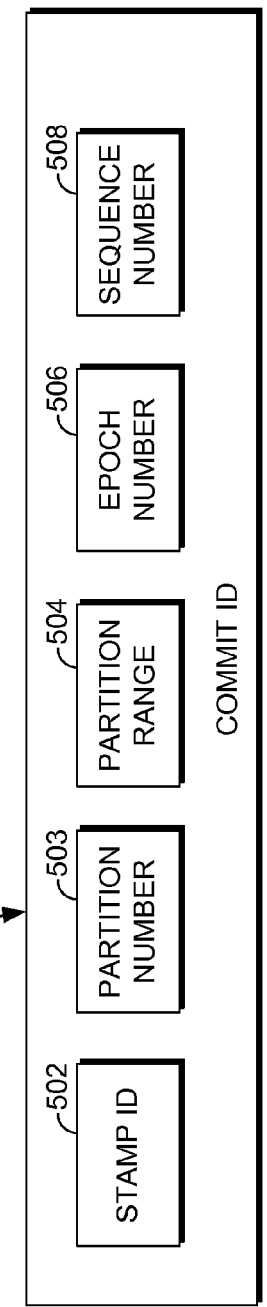
FIG. 5 depicts a block diagram of a commit identification (commit ID), in accordance with embodiments of the present invention.

Turning to FIG. 5, illustrating a block diagram of a commit identification ("commit ID") 500, in accordance with embodiments of the present invention. A commit ID is an identification utilized to ensure committal of data during replication. Because embodiments of the present invention do not require the sequential communication of data (or receipt of data), a commit ID is utilized to ensure committal of the data in a storage stamp. A commit ID may specify how far the destination partition can commit the geo messages/transactions (data) for that storage stamp and/or partition range (e.g., a commit ID may be different across different partitions). The commit ID may include (as illustrated in FIG. 5) a stamp ID 502, a partition number (#) 503, a partition range 504, an epoch number (#) 506, and/or a sequence number (#) 508. It is understood that a commit ID may contain more or fewer portions of information. However, in an exemplary embodiment, a commit ID contains at least an epoch # and a sequence #.

The stamp ID 502 is an identifier of a source stamp. For example, a stamp ID may uniquely identify a primary storage stamp supplying data to a secondary data stamp. The partition range 504 represents, in an exemplary embodiment, a source key range to which the commit advancement is to be applied (e.g., a range of items that may be committed on a secondary data store). However, the partition range can be different than the source partition's key range or different from the partition range in a message ID, if the partition is committing in a parent's region but sending the transactions from its region.

An epoch # and a sequence # are sequential values that increase, but there may be gaps in them (e.g., a valid sequential order may include 1, 2, 3, 6, 7 . . . ). An epoch # may be conceptually thought of as a chapter number and the sequence # may be thought of as a chapter's page number that starts over with each new chapter. As a result, a particular transaction or a particular partition may be identified utilizing an epoch # and a sequence #. The epoch #506 represents an instance of the partition the commit is coming from (or associated with). The partition #503 represents the current live instance of a partition being served. Each time a partition is loaded, this # is increased.

The sequence #508 (seq #) represents the latest sequential transaction to be committed. This tells a secondary storage stamp, that all transactions up to that epoch # and seq # can be committed on the secondary storage stamp. The epoch # changes every time there is a split or merge of the partition. To allow out of order and parallel sending of geo messages (e.g., data) to the same secondary data stamps, the commit ID for a given transaction (transaction X) will be sent from the primary to the secondary after an acknowledgement for the geo message with the transaction is received from the secondary and acknowledgements for all other geo messages with earlier transactions than the transaction X are received from the secondary.

Similarly related to a commit ID, a geo-message may be comprised of a stamp ID, a partition # and partition key range. These are associated with the overall geo-message. Further, a geo message may also be comprised of one or more transaction. In this example, each transaction has an epoch # and sequence #. In this example, the epoch # and sequence # is unique at the transaction level, whereas the stamp ID and the partition # is at the geo message level.

A commit ID may accompany data sent from a primary data stamp to a secondary data stamp. For example, each geo message sent from a primary (data stamp/store) to a secondary (data stamp/store) may include a commit ID from the primary. Therefore, the primary may be piggybacking onto a given communication an identifier authorizing sequential data up through a given commit ID to be committed at the secondary. In an exemplary embodiment, the commit ID indicates the largest consecutive transaction that has been written to a GML at the secondary for which the primary has received an acknowledgement back as to the writing of the transaction to the GML. Because an acknowledgement has been received from the secondary, the primary can ensure that data at least through the commit ID is persisted to at least the GML of the secondary (if not already committed at the secondary).

However, it is also contemplated that a commit ID is communicated at defined intervals or at defined periods of inactivity in commit ID communications to allow a secondary to make progress in committing data. This ensures that the latest commit ID for a source partition of a primary is sent to all of the partitions on a given secondary that may include a portion of the source partition's data. Consequently, the destination's partitions can make progress on committing the pending transaction waiting to be replayed from a GML.

Figure 6:
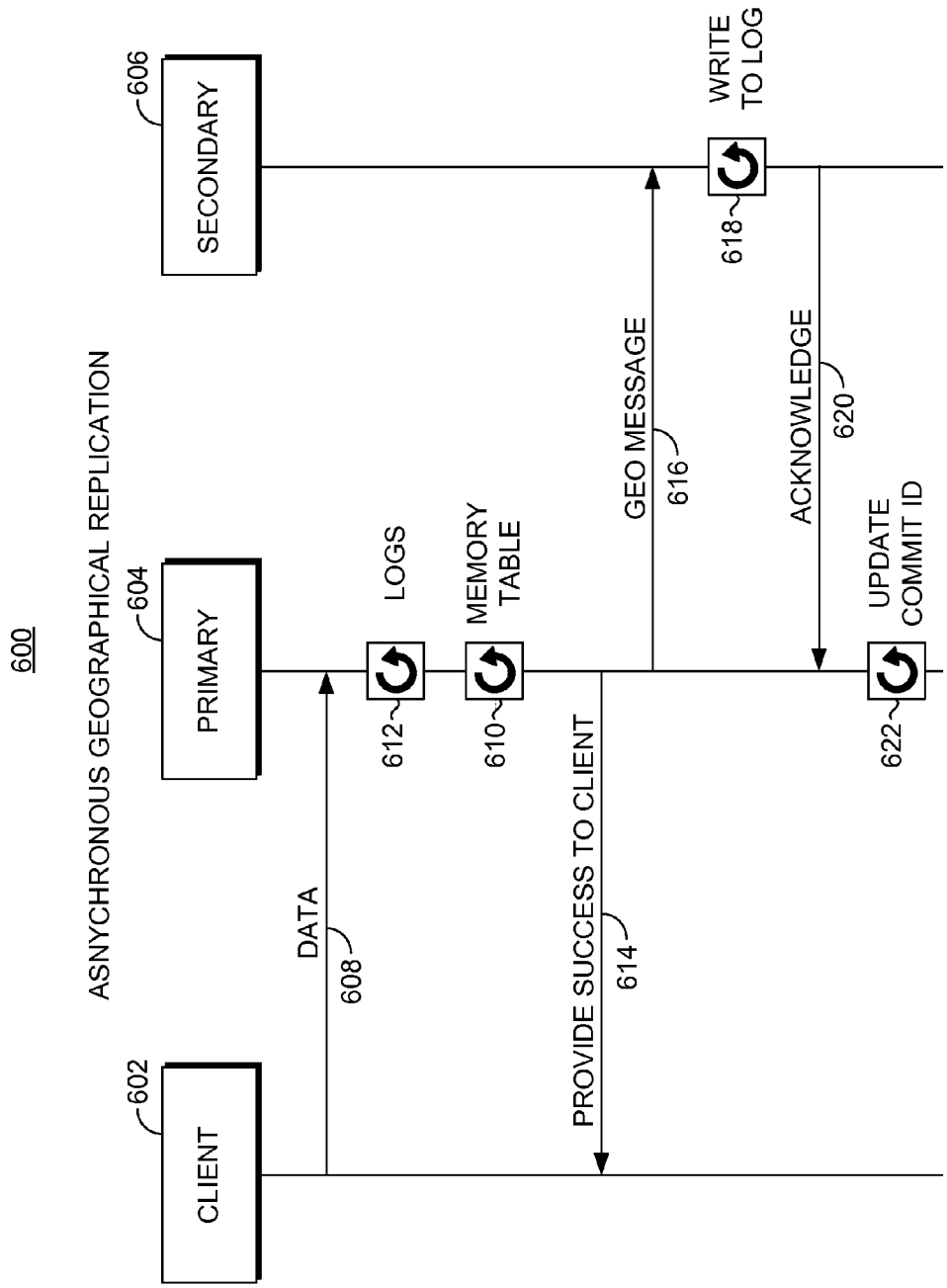
FIG. 6 depicts a block diagram illustrating a temporal flow for an exemplary asynchronous geo replication, in accordance with aspects of the present invention FIG. 7 that depicts an exemplary relationship of various replication methodologies as contemplated herein, in accordance with aspects of the present invention.

Turning to FIG. 6 that depicts a block diagram of process flow 600 of an asynchronous geo replication, in accordance with aspects of the present invention. The process flow 600, in this example, occurs between a client 602, a primary data stamp (primary) 604, and a secondary data stamp (secondary) 606. It is understood that additional entities, machines, components, applications, services, and the like may be incorporated into a process flow to effectuate asynchronous geographical replication.

The client 602 communicates data 608 to the primary 604. As previously discussed, the client 602 may be associated with an account that has been assigned to or has chosen to utilize the primary 604 as a primary geo location for committing data. The primary 604 may rely on an XFE (front-end) to verify the data 608 is intended for the primary 604. Upon receiving the data 608, the primary 610 may write the data 608 to a log (or stream). The primary 604 may alternatively (or additionally) commit the data 608 to the primary 604. Committal of the data 608 may include persisting the data 608 to the logs 612 of the primary 604.

In an exemplary embodiment, once the data has been written to a log or other data stream of the primary 604, an acknowledgement 614 of success may be returned back to the client 602. In an additional exemplary embodiment, once the data 608 is committed to the primary 604, the acknowledgement 614 is provided to the client 602.

By providing a success acknowledgement to the client 602 prior to actual committal of the data to a secondary geo location, the lapsed time between communicating the data from the client to receiving the confirmation of success may be reduced. However, as will be discussed in greater detail hereinafter, a synchronous geo replication methodology may also be implemented that provides a success acknowledgement back to the client once the data has been at least written (as opposed to full committal) to both the primary and the secondary. Synchronous geo replication may require a greater latency between communicating the data from a client to receiving an acknowledgement of success back from the primary (or the secondary).

Returning to FIG. 6, after providing the success acknowledgement 614, the primary 604 communicates a geo message 616 to the secondary 606. In an exemplary embodiment, a geo message is the data 608 that has been annotated with a record, such as a geo annotated record ("GAR"). In another exemplary embodiment, a geo message is a collection of transactions (collection of communicated data groupings) that have been batched to form a geo message for a particular geo location, stamp, and/or partition. A geo message may include a message ID that uniquely identifies that geo message (e.g., epoch # and sequence #). Further yet, a geo message may be further annotated to include a commit ID from the primary 604.

In an exemplary embodiment, a GAR is additional information stored with the transaction logs that will be used to replay/execute the log on the secondary stamp's partitions. There could be one GAR stored for each transaction. There can be many log entries making up a transaction, with a final commit log entry for the transaction. In this case, the GAR for the transaction could be stored with the final commit log entry. This information may indicate (a) what the original transaction was (e.g., Put Block, Put Block List, etc), which is used to determine how to correctly replay the transaction and hook things up at the destination, and (b) include additional information to re-execute the transaction at the destination (e.g., Last Modified Time, for Put Block List the final block list indicating if the blocks came from the committed or uncommitted list). In its most primitive form, the GAR may include the full incoming transaction to be performed on the primary, but there should be enough information included to completely and deterministically replay the transaction on the secondary, which results in more information being communicated for the GAR depending upon the type of transaction. For example, this can include results calculated during the execution of the transaction, such as timestamps and ETags. In addition, the GAR may contain a transaction key record that is written in the primary logs and sent with every geo transaction to the secondary. This record may contain the key and the geo transaction id (e.g., epoch # and seq # from the primary) of the transaction. It is contemplated that the GAR may be stored in its entirety, while other embodiments contemplated generating portions of the GAR prior to communicating a geo message to a secondary.

Transactions executed on a partition server have one or more records written to one of three exemplary log streams (e.g., update log, block log, and page log). If the partition server fails before converting the memory table to a checkpoint in the data stream, the logs can be used to replay the transactions to regenerate the memory table. As a result, geo replication may not require additional log streams at a partition to allow the partition to be a source of geo replication. This is in part, because geo-transactions can be packaged up from the Update/Block/Page logs for live geo replication (and checkpoints for checkpoint-based geo replication).

With geo replication, a GAR may be added to the transactions in the existing log streams. This GAR, along with what is already being written to the logs, may contain the additional information needed to re-execute/replay the transaction on the secondary storage stamp for geo replication. However, GARs may not have meaning for the replay of the logs at the primary. Instead, the GARs are there so that they can be passed to the secondary storage stamp to specify how to re-execute/replay the transaction at the secondary stamp. In addition, part of a GAR can also be generated dynamically from the information already in the logs, instead of storing it into the logs. In this case, the GAR is generated with the necessary condition and special values, and it is added to the geo message before sending it to the secondary.

A geo message, in an exemplary embodiment, may include 1) a message format version; 2) a field to say if the message is compressed or not; 3) a message accounts portion—this may be the list of storage account names the geo message represents. These accounts names may be validated by the XFE making sure that those accounts are marked as secondary at the stamp the message arrives at. A geo message may also include: 4) a table name; 5) a table version—schema version of the table; 6) a log record version—version number of the transaction log records in the message; 7) a field to say if the message is intended for fan out or not, where fan out means to send this message to all of the target partitions on the secondary for the partition range represented by the source partition. If fan-out is not specified, then it is acceptable to send the geo message to just the target partitions on the secondary with the storage accounts or keys specified in the geo message.

The geo message may also be comprised of 8) a message ID—this represents the group of geo-transactions going from this partition to a given storage stamp. A message ID may include a) a stamp ID—source stamp; b) a partition #—this is used to identify all of the messages being sent from a given running instance of a partition. This is specifically used to deal with the issue of partition reload, and the fact that recent geo-transactions may be repackaged up differently and resent to the secondary partition, and the partition # is used to determine at the secondary when this potentially can happen. The message ID may also be comprised of c) a partition range—partition key range for the transactions in the message.

The geo message may also be comprised of 9) a commit ID—as previously discussed, this may include the information representing up to what epoch # and seq # from the source partition can be considered for committal at the secondary for a given key range.

The geo message may also be comprised of 10) batches for each distinct partition key. This may represent a batch set of transactions as part of this geo message. If a set of geo-transactions has to be performed together, then they may be in the same batch. It is at the level of batches that the XFE can split the geo message across multiple different partition servers if not all of the batches (based on the range) need to be sent to each of the destination partition servers for the geo message. Each batch may contain a) partition keys; b) record offset and size in the records buffer for this partition key; and c) a list of geo transaction IDs and their key information used to replay the transaction and used to indicate when they can be committed on the secondary: 1. Partition Range—partition range for the batch; 2. Epoch #—All of the geo-transactions in the batch have to have the same Epoch #; 3. Seq #—There is a Seq # for each geo-transaction in this batch. Further, the geo message may also be comprised of 11) data log records for the transactions in the message Returning to FIG. 6, the geo message 616 is communicated to the secondary 606. A destination partition of the secondary 606 can see geo messages come in an out-of-order sequence (non-sequentially). However, an in-order commit for a given object or range of objects may be enforced at the destination partition when the geo-transactions are replayed out of the GML of the secondary 606. The epoch # and seq # that is provided in a Message ID for the geo-transaction is used to indicate what set of transactions are allowed to commit based upon the commit ID. Additionally, the destination partition can receive sequence numbers with holes and needs to know when to commit. The holes may occur when a source partition sends transactions to N different destination partitions, so not every destination partition receives all transactions from a given source. Holes may also exist because transactions on the primary with a given sequence # may result in an expected error (e.g., update an object that doesn't exist), and the expected error is returned back to the client and the transaction is never packaged up into a geo-message for replication. The Stamp ID/PartitionRange/Epoch#/Seq# that is included with the Commit ID specifies how far the destination partition can commit the geo messages/transactions for that secondary and partition range.

The secondary 606 may then write the data of the geo message 616 to a log 618. In an exemplary embodiment, the log is a GML for a partition of the secondary 606. All of the incoming geo messages to a partition are stored into the partition's geo message log. Once a new geo message arrives at the secondary 606, the geo message is stored into the GML and success is returned back to the XFE of the secondary 606, in this example. The geo message may contain a Commit ID that indicates if the committing of geo-transactions can move forward or not. Geo messages with earlier sequence numbers than those in the Commit ID can be committed, and those messages are replayed on the secondary 606 using annotation information discussed previously. During the replay on the secondary 606 the corresponding log records are stored into either an Update Log, a Block Log, and/or a Page Log, in this example, with whatever values that needs to be updated.

Continuing with this example, when the transaction is replayed from the GML, it is replayed into a corresponding Update/Block/Page logs with fields updated (e.g., TBL and CBL pointers) correctly. An advantage of starting with a separate GML (as opposed to using the existing logs) is that all of the geo message information is contained strictly in the GML. Then, after a geo-replay of the data is performed at the destination partition, everything is in the Update/Block/Page logs and Memory Table for the transaction to exist and logic does not have to be modified to deal with those logs or the replay of that information. This keeps the replay of geo messages from the GML separate from the partition replay log logic from its logs, especially since the partition replay logs may be kept small to have fast partition load time when a partition is reloaded on the secondary location.

In this example, replay from the GML into the Update/Block/Page logs and Memory Table commits the data into the live state of the partition before an update is generated to advance the "consumed" record for the GML. As a result, when reloading the partition on the secondary 606 (e.g., in the event of a failure) a point to start replaying from the GML should be determined. That point is determined by storing the "Consumed ID" with the geo-transactions that are stored into the Update/Block/Page logs during their replay. This Consumed ID may include the Stamp/PartitionKeyRange/Epoch/Seq# of the last geo-transaction replayed from the GML. In addition, a max Consumed ID may be maintained for a given part of the partition's key range, which is potentially stored in a metadata stream each time a checkpoint is performed. The pointer to the checkpoint record may be stored in a metadata stream. Regeneration from a last point in the GML may be accomplished by taking the max Consumed ID from those stored in the checkpoint and those found when replaying from the Update/Block/Page logs.

Returning to FIG. 6, after writing the data to the log 618, the secondary 606 (e.g., by way of an XFE) may communicate an acknowledgement 620 to the primary 604 that the data has been written (or committed). The acknowledgement 620 may include a message ID associated with the geo message 616 to identify what transactions (epoch # and seq #) have been written to the secondary 606. The primary may then update the commit ID 622. Eventually, either as part of a subsequent geo message or as a result of a fan-out-type message, the updated commit ID 622 may be communicated to the secondary 606 to allow for a greater amount of the data maintained in the GML to be committed at the secondary 606.

Full Object, Delta Checkpoint, and Log-based Replication Methodologies

Figures 7, 8:
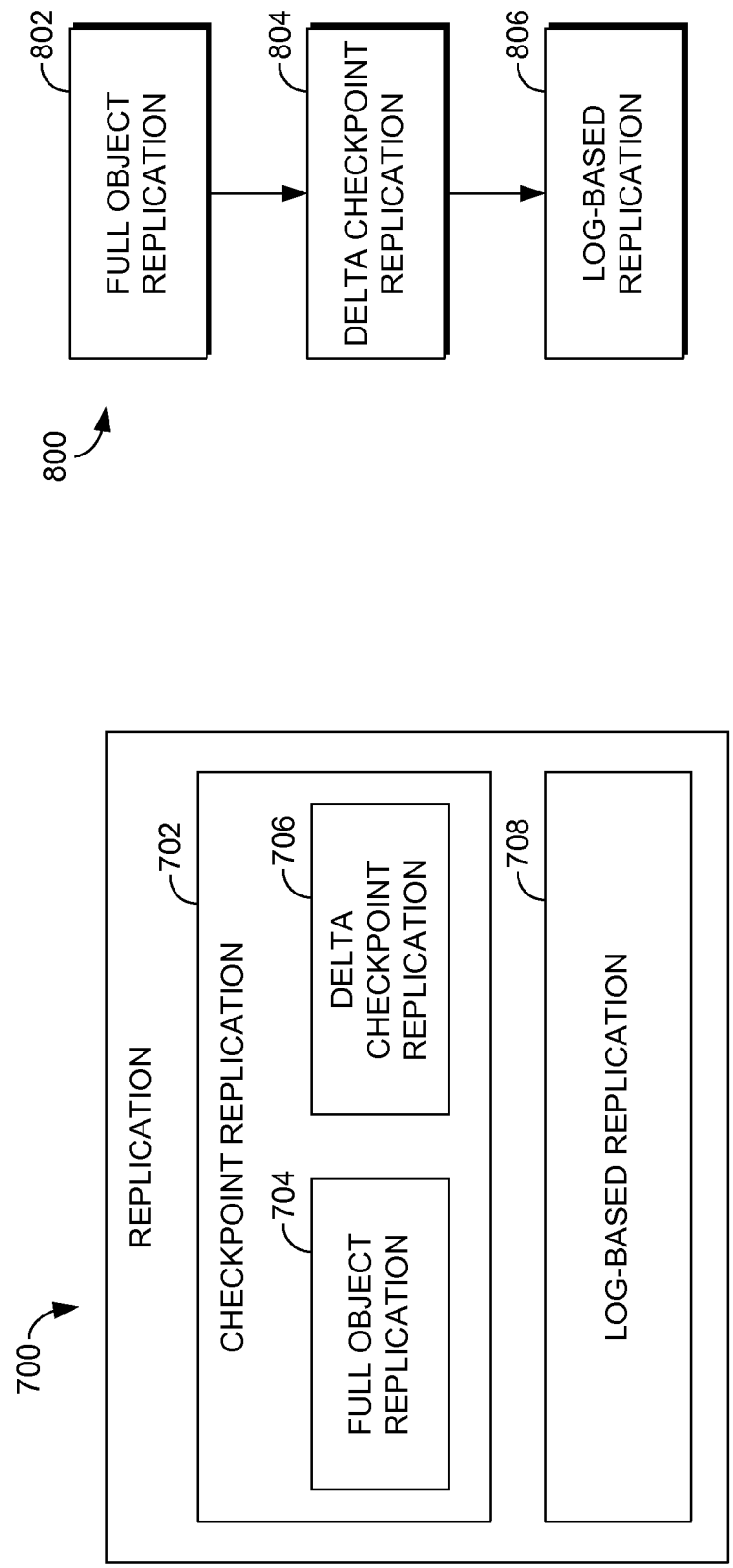
FIG. 8 depicts a block diagram representing an exemplary methodology for replicating data from a primary data store to a secondary data store utilizing a hybrid approach to replication, in accordance with embodiments of the present invention.

Turning to FIG. 7 that depicts an exemplary relationship of various replication methodologies as contemplated herein, in accordance with aspects of the present invention. The overarching concept of replication may include both checkpoint replication 702 methodologies and log-based replication 708 methodologies. Further, it is contemplated that the checkpoint replication 702 methodologies may include full-object replication 704 methodologies as well as delta-checkpoint replication 706 methodologies.

As will be discussed in greater detail hereinafter, it is contemplated that any one, or a combination, of the various replication 700 methodologies may be utilized within a distributed computing environment to replicate data from a primary data store to a secondary data store.

FIG. 8 depicts a block diagram representing an exemplary methodology 800 for replicating data from a primary data store to a secondary data store utilizing a hybrid approach to replication, in accordance with embodiments of the present invention. The methodology 800 includes full-object replication, as depicted at a block 802, delta-checkpoint replication as depicted at a block 804, and log-based replication as depicted at a block 806.

Full-object replication, in an exemplary embodiment, is a checkpoint-based replication of a full state of an object. The full state of an object may be determined by evaluating one or more checkpoints to identify the complete contents for that object. For example, a blob (binary large object) may be described by 1 terabyte of data. In a full object replication mode, the entire 1 terabyte of data is communicated from a primary data store to a secondary data store, where it is to be committed, as part of the full-object replication. Once the blob is committed at the secondary, the current state of that blob, as of the time of evaluating checkpoints, is replicated at the secondary. Full object replication may utilize a checkpoint (or a plurality of checkpoints) to communicate the full state of every object of an account (or a partition) to a secondary data store. It is contemplated that full object replication allows for a bootstrap from a primary to a secondary data stamp for a given object.

Delta-checkpoint replication, which is also another form of checkpoint replication, is a replication methodology that may be utilized when replication has occurred up through a known checkpoint for a partition range. Delta-checkpoint replication reduces a need to recopy the full contents of an object that has previously been replicated from a primary data store to a secondary data store. For example, the 1 terabyte blob discussed above with respect to full-object replication may have a relatively small update that occurred since the full-object replication. In this example, it may be desired to only communicate the delta (e.g., changes) from the last full-object replication point to a current state. Therefore, delta-checkpoint replication may be utilized to communicate data associated with a change to the blob as opposed to data for the full content of the blob.

A checkpoint is a snapshot of the state that a range partition is in at a given point. A checkpoint may identify one or more commands, inputs, variables, data, pointers, queues, messages, and the like, that, once replayed, allow for a state of an account or a partition to be recreated. At some point the partition server takes a memory table and creates a checkpoint in the partitions data stream(s). When this occurs the memory table is then deallocated from memory, since the checkpoint data that was in that memory table is the persisted version of that data used to serve up client requests accessing that version of the data. The data stream contains a series of checkpoints at a primary data store representing the state of data (e.g., objects) maintained at the data store. For example, a memory table may be populated with objects that are requested by a client of the data store. The log records are used to populate the memory table if the partition is reloaded. Then the memory table is checkpointed to the data stream after enough updates have accumulated for the partition to warrant the need for a checkpoint. Therefore, a checkpoint may provide an efficient mechanism for recreating a state of an object, since it is the persistent state of all of the data for the range partition, except for the very latest updates sitting in the memory table/logs. It is contemplated that a series of checkpoints may be used to recreate the state of an object.

Log-based replication is a replication methodology that relies on one or more logs at a primary to source data for replication to a secondary data store. For example, when an object is committed at a primary (or even received) the data may be written to an update log of the primary data store for persistence of the data. Therefore, if the primary data store fails over before an additional checkpoint is performed, the update log may be used to replay and recreate a memory state of the primary data sore. Those records written into the log may also be utilized to recreate a state of the state of an object on the primary to a secondary data store for inter-stamp replication. It is contemplated that the records from a log at the primary data store are annotated with information to allow for the replay of those records at the secondary data store.

Returning to FIG. 8, an exemplary scenario that may illustrate the methodology 800 includes the following; however, the following is not intended to be construed as limiting. When an inter-stamp replication is requested initially for a partition range (portion of a storage stamp), full-object replication of the block 802 is utilized. The full-object replication may begin with identifying checkpoints for the partition range to be replicated. In this example, there may be three checkpoints, A, B, and C that have been previously created for the partition range. While it is contemplated that each checkpoint A, B, and C may be communicated independently to the secondary for writing to one or more logs, it is also contemplated that A, B, and C are merged at the primary prior to communicating to the secondary or may be merged on the fly in memory while reading the data to perform the inter-stamp replication. This process of merging may reduce resources required to replicate the partition range (e.g., bandwidth to communicate the checkpoints). The merge process may account for the latest changes to an object as described in the various checkpoints. The checkpoints A, B, and C may be communicated from a primary data store to a secondary data store (either through a merge or independently).

However, during the communication (and/or merging) process, the primary data store may generate one or more additional checkpoints (e.g., D and E) that are not included in the initial checkpoints (e.g., A, B, and C). As a result, a delta-checkpointing process as depicted in the block 804 may be utilized to account for the recent changes to objects as included in the checkpoints D and E. However, as will be discussed with FIG. 12, a log-based replication process may also be used to replicate changes since the full-object replication if the relevant records are still maintained in one or more logs of the primary data store.

The delta-checkpointing process, in this continuing example, may include merging the checkpoints D and E. Alternatively, it is contemplated that a delta-checkpoint process is performed from checkpoint D followed by a delta-checkpoint process for checkpoint E. Regardless, the delta-checkpointing process communicates changes that occurred to an object during a time period represented by checkpoints D and E. For example, the changes to the object may have occurred after checkpoint C was generated and up to the generation of checkpoint E. Therefore, less than the full state of an object is communicated from the primary data store to the secondary data store as part of the delta-checkpointing process. The delta-checkpointing process may continue until all checkpoints (which may be continued to be created during the delta-checkpointing process) for the range partition are replicated to the secondary.

Once the data of a primary data store for a partition range has been replicated through one of the checkpoint replication techniques, a log-based replication process as depicted in the block 806 may be utilized. In this continuing example, the log-based replication process may serve as a default process by which all data is replicated once a range partition is caught up (the last checkpoint has been replicated until log-based replication can begin). In an example, the log-based replication updates to be communicated from the primary to the secondary are maintained in a buffer at the primary data store, but if the buffer exceeds a predefined threshold of memory space, records from an update log of the primary may be read and sent to the secondary data store. However, if the log-based replication process is unable to keep up with desired write/delete traffic, then the process may return back to a checkpoint replication process. This may occur when communication between the primary and the secondary is compromised for an extended period of time. This may also occur to optimize the resource utilization for inter-stamp replication by sending over an aggregated checkpoint or delta-checkpoint instead of many individual updates coming from the client in the log-based approach. Sending over the aggregated results of many update log entries can save bandwidth as well as execution/replay resources on the secondary. In addition, the load on the secondary may be such that the replaying for geo-replicated transactions from its GML cannot keep up, and it may acknowledge back to the primary to slow down, which could then prompt the primary to go back into a checkpoint-based approach. In contrast, the benefit of the log-based approach is that when used, it can result in the lowest latency for replicating a change on the primary to the secondary.

To perform checkpoint-based inter-stamp replication (e.g., full object and delta-checkpoint replication) the primary partition traverses the set of checkpoints that are to be replicated. To do this the partition keeps track of a current set of checkpoints being replicated and a checkpoint replication key ("CRK") in a metadata stream. The CRK keeps track of what object the checkpoint-based replication process is at while performing the replication. The partition range being replicated has a start key (key low) and end key (key high) that represents its full partition range. In an exemplary embodiment, the checkpoint-based replication for a set of checkpoints starts by setting CRK to the start key, and then it scans through the checkpoints from that key to the end key finding all objects updated in those checkpoints, and it inter-stamp replicates each object as it goes. If it is a full-object replication, then the full object is sent over, if it is a delta-checkpoint replication then just the new data updates for these recent checkpoints is sent over to the secondary.

To replicate a full object or changes in the delta-checkpoint, the data contents may be injected into the current state of the secondary and correctly represent the state of the object when accessed from the secondary. One way is to create special transactions that represent the different types of full objects or their updates from checkpoints that optimize the replay of those object updates on the secondary. Another way is to take each of the objects or their checkpoint updates and translate those at the primary into the same transactions (e.g., log entries) already supported for updating the objects and send them from the primary's memory to the secondary for geo-replication. This later approach allows the underlying geo-message format, sending of geo-messages from the primary, and GML replay on the secondary to be used for both checkpoint-based replication and log-based replication.

A checkpoint represents an aggregated set of changes to a set of objects. Sometimes replaying those objects into the secondary is as simple as just inserting the objects contents into a new row in a memory table at the secondary. In other cases, the aggregated checkpointed object represents a series of complex changes made to an object at the primary, and inter-stamp replicating an object may result in a series of changes being sent and applied from the primary to the secondary. Even when replicating a checkpoint-based object results in many transactions sent from the primary to the secondary, the total sum of these transactions is usually either the same or less than what would have been sent over using log-based replication. For example, the storage system may support an update blob operation that allows just parts of a blob to be updated, and in addition it supports a snapshot operation that allows new versions of the same blob to be created, where all live versions of a blob can be accessed.

In addition, the system may ensure to only store one copy of an updated block across the different versions of the blob. Now a given checkpoint can represent many updates to a given blob as well as many snapshots taken of the blob. To replicate this via a checkpoint-based approach, the primary's CRK may identify a blob and indicate that it has many live updates and many snapshots taken. The primary may then reconstruct a set of transitions that would optimally apply the updates and the snapshots in the correct order on the secondary to recreate the same set of snapshots and their contents and the sharing of data across them on the secondary. Note, there may be updates to the blob that are not part of the final checkpoint because the contents changed while the blob was represented in the memory table before the checkpoint happened. Since those changes are no longer live/captured, they do not need to be replicated. This is one of the differences between checkpoint-based and log-based replication. In contrast, log-based replication may have sent over every change to the blob to the secondary, even though some of them may have short life time due to later updates that overwrote/changed a prior update.

When performing checkpoint-based replication, the transaction records dynamically created for each object is sent to the secondary using the same exact path as already described in exemplary FIG. 6. Each of these transactions is given an epoch # and sequence #, they are packaged up into geo-messages, and sent to the secondary GML and replayed like any other normal transaction coming into the partition from the client. In an exemplary embodiment, the sequence # series used for checkpoint-based replication is a different one from log-based geo-replication. This is to allow the commit ID to work with both of them when switching from checkpoint-based replication to log-based replication and back and forth. This is because the commit ID represents committing all transactions up to this epoch # and sequence #. Therefore, a separate checkpoint sequence # series may be maintained for checkpoint-based transactions and a separate log sequence # series for log-based transactions being geo-replicated, and the commit ID contains both of these sequence #s so that the secondary knows how much to commit up to for these two geo-transaction sources that may come into its GML.

While a partition range is in checkpoint-based replication, the CRK may be stored with the commit ID along with a pointer to the checkpoints that are currently being replicated on the primary's metadata stream. The CRK advances in scan/merge order across all of the objects in the checkpoints being replicated, dynamically generating the geo-transactions to be replicated on the secondary. As the commit ID advances during checkpoint-based replication, the commit ID, along with the CRK, is stored in the metadata stream along with the set of checkpoints that are part of the current replication going on. When a partition is reloaded, the checkpoint-based replication reads the metadata stream to know the set of checkpoints being used for checkpoint-based replication and what CRK to start at to continue replication and the last commit ID.

The methodology 800 provides an exemplary high-level overview of a possible hybrid approach to replication. The full-object replication at block 802 may be responsible for replicating large quantities of data (e.g., bootstrapping the partition range to the secondary data store). The delta-checkpoint replication at block 804 may be responsible for replicating data that has been checkpointed as the full-object replication process is being performed. The log-based replication at block 806 is responsible for replicating data as maintained in one or more logs of the primary data store. Log-based replication may have the shortest latency between being received at a primary and being replicated to a secondary data store. Whereas the delta-checkpoint approach may have better utilization the bandwidth between stamps and replay resources on the secondary.

Figure 9:
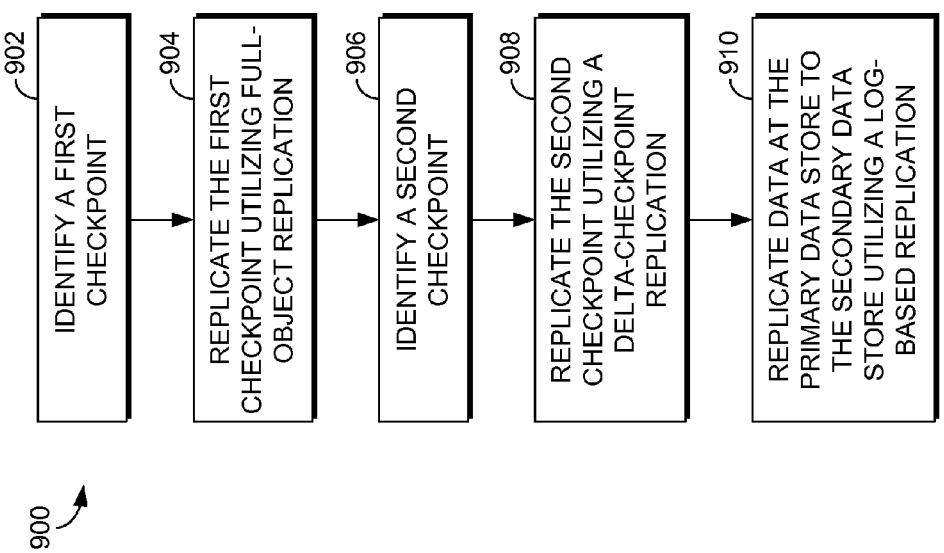
FIG. 9 depicts an exemplary method for replicating data utilizing a combination of replication processes in the distributed computing environment, in accordance with embodiments of the present invention.

FIG. 9 depicts an exemplary method 900 for replicating data utilizing a combination of replication processes in the distributed computing environment, in accordance with embodiments of the present invention. At a block 902, a set of checkpoints are identified for a given partition range. This represents a set of checkpoints that contain data that have not yet been replicated to the secondary partition. Each range partition keeps track of what checkpoint contents have been replicated to the secondary using either replication approach (checkpoint-based or log-based replication). The partition range that is to be replicated may represent data associated with a particular account. Therefore, an account-level replication process may be performed by identifying a partition range for that account.

It is contemplated that one or more checkpoints may be identified at the block 902. If more than one checkpoint is identified, a merge operation may be performed by the primary data store to merge contents of the multiple checkpoints prior to communicating to the secondary data store.

At a block 904, the identified first checkpoint is replicated to a secondary data store utilizing full-object replication. In this example, the secondary data store is in a different geographical location than the primary data store. As discussed previously, the secondary may be in a different city, a different state, a different country, or even in a different continent from the primary data store. The replication of block 904 may include communicating the checkpoint identified at the block 902 to the secondary data store. Also as discussed previously, the replication may include writing the data to a log at the secondary and then eventually committing the data to the secondary.

As previously discussed, the full-object replication may include replicating the full state of an object from the primary data store to the secondary data store. The full state of an object is more information than merely communicating portions or changes to a state of the object, which may be done in delta-checkpoint replication. Therefore, in an exemplary embodiment, the full-state replication process may communicate the entire contents of an object to be replicated from the partition range.

As used herein, the initiation of a replication process may include preparing data for replication, such as by communicating the data from a source towards a destination. Additionally, the initiating of a replication process may include coordinating, locally, with a location service, an account control unit, and/or a front end service for data to be replicated from the source towards the destination. Therefore, the initiating of replicating allows for data from a source to be replicated to a destination; however, the destination may not be manipulated to affect the initiating of the replication processes.

At a block 906, a second checkpoint is identified by the primary data store. In an exemplary embodiment, during the process of identifying and replicating the first checkpoint, the primary data store is continuing to receive and process data, which may be checkpointed at the primary to represent the persistent state of the partition. As a result of this continued checkpointing after the replication of the first checkpoint, the second checkpoint that is identified may also be replicated. Unlike full-object replication that replicates the full state of an object, the delta-checkpointing operation may only communicate replication changes to an object that are reflected in the second checkpoint. For example, to prevent copying the full contents of a blob that is already partially replicated to the secondary data store, blob pointers that point to blocks of data in a stream that define the blob may be identified to locate data in blocks that have been changed since the last checkpoint occurred. In this example, only those blocks that have changed may be communicated to the secondary data store for replication. Further, in this example, a time stamp may be associated with table entries (or other data entries) to determine which entries occurred after a given checkpoint. Consequently, delta-checkpointing replication allows only data that has changed since a previous checkpoint to be communicated for replication.

Delta-checkpoint replication, in an exemplary embodiment, does not communicate the entire state of an object to the secondary data store. Instead, only portions of the data that reflect changes to that object relative to the state of the object on the secondary data store are communicated. Stated differently, a "version" of the object that is maintained on the secondary is updated with information found in a later primary-data-store checkpoint without sending the entire previous "version" of the object.

At a block 908, the primary data store replicates the second checkpoint utilizing the delta-checkpoint replication process. In an exemplary embodiment, replication processes are coordinated, in part, by a location service, one or more ACU's, and/or front ends associated with the primary data store and/or the secondary data store. In this example, the primary data store replicates the data of the second checkpoint to the secondary data store. The replication process may include communicating the data to the secondary data store in a manner that allows for the secondary data store to write the data to a log for eventual replay and committal of the data.

In an exemplary embodiment, the delta-checkpoint replication continues until all checkpoints during the execution of a checkpoint replication process have been replicated. To maintain this cycle, a determination may be performed by the primary data store (or specifically the partition servers serving the range partition) to determine that additional checkpoints for the partition range have not been created since the last checkpoint to be replicated.

At a block 910, data at the primary data store is replicated to the secondary data store utilizing log-based replication. As previously discussed, log-based replication may not utilize checkpoints for a partition range, but instead, replicates records from one or more logs for the partition range. For example, once data is committed to the primary data store by writing to the update log stream, if the primary fails the primary data store may replay the log stream to recreate a memory state of the table from the last checkpoint. In this regard, the records within the update log may be communicated to the secondary for replication. To transition from block 908 to block 910, the primary partition may know where in the update log stream the last checkpoint it is replicating for block 908. When it is done replicating that, the primary then switches to log-based replication starting at that point in the update log, in an exemplary embodiment.

In an exemplary embodiment, the records may be annotated with additional information (e.g., type of transaction) to facilitate replay of the record at the secondary. In addition, a commit ID annotated (e.g., added) to the record to optimize where to continue geo replication if the partition is reloaded.

The primary may continue to monitor the log-based replication process to ensure that the log-based replication process does not go above a defined threshold for latency. The latency may be caused by a communication failure between the primary and the secondary data stores. If this threshold is exceeded, the primary data store may revert to a checkpoint-based replication process (e.g., delta-checkpoint replication, full-object replication). In addition, the primary may switch from log-based replication to checkpoint-based replication if the secondary communicates back to the primary that it is not keeping up with replay of the transactions from its GML, or if the primary determines that bandwidth needs to be reduced between those two stamps, or if the primary determines that it can save bandwidth to the secondary and/or replay time on the secondary by sending over aggregated checkpoint-based transactions instead of the update log approach which represents every update coming in from the client.

Figure 10:
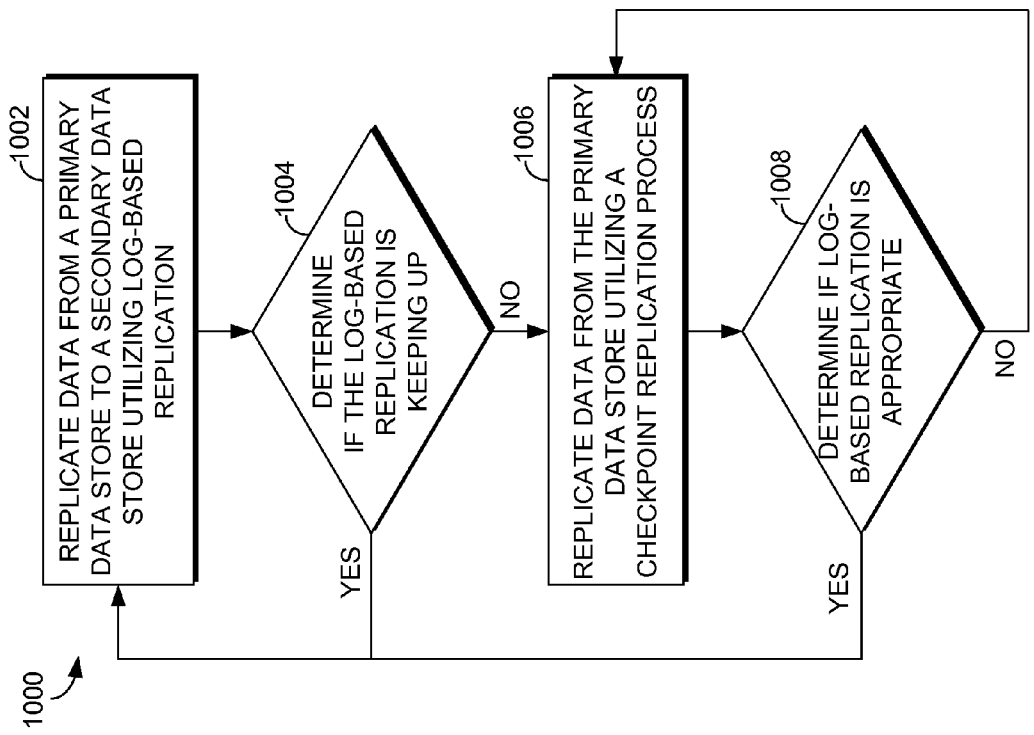
FIG. 10 depicts an exemplary method for replicating data in a distributed computing environment utilizing a plurality of replication processes, in accordance with aspects of the present invention.

FIG. 10 depicts an exemplary method 1000 for replicating data in a distributed computing environment utilizing a plurality of replication processes, in accordance with aspects of the present invention. At a block 1002, data from a primary data store is replicated to a secondary data store utilizing a log-based replication. In an exemplary embodiment, a partition range was previously replicated to the secondary to allow a log-based replication to occur. However, it is also contemplated that log-based replication may also be utilized to replicate data from an initial point of creation for a new account at the primary. Consequently, checkpoint-based replication methodologies may not be needed since the state an object on the primary may be replicated from a log of that primary (logs may be flushed when they are no longer needed for inter-stamp replication and its corresponding memory table has been captured as a checkpoint in the data stream).

At a block 1004, the primary data store may perform a determination if the log-based replication is keeping up (e.g., a determination if the log-based replication is performing above a predefined threshold of replication throughput from the primary data store to the secondary data store). The log-based replication is considered to be keeping up, in an exemplary embodiment, when the amount of data maintained in a log of the primary data store does not exceed a predefined threshold before being communicated to the secondary data store for replication. Additionally, it is contemplated in an exemplary embodiment that the log-based replication is keeping up when a latency threshold between receiving the data at the primary data store and communicating the data to the secondary data store does not exceed a predefined level. Further, it is contemplated that an additional exemplary embodiment that a buffer at the primary data store that maintains data from the log to be replicated at the secondary exceeds a predefined threshold, the log-based replication is no longer keeping up. Other scenarios are contemplated for when a log-based replication is not keeping up. These scenarios may include when the primary determines that it (a) wants to reduce bandwidth between the two stamps, (b) the replay at the secondary isn't keeping up with the incoming transactions to the primary, or (c) based on the transactions it is determined that additional saving can be had by sending over aggregated results to the secondary instead of each transaction as it comes in from the client. For example, network bandwidth consumed can cost different amounts during different times for a day, and saving bandwidth at the peaks using a checkpoint-based approach can be worthwhile.

The determination at block 1004, if determined that the log-based replication is keeping up and it wants to continue with log-based replication, returns to the block 1002 where the log-based replication continues. However, if the determination at the block 1004 determines that the log-based replication is not keeping up or it wants to perform one of the above optimizations using checkpoint-based replication, the method 1000 advances to a block 1006 where data from the primary data store is replicated utilizing a checkpoint replication process. As discussed with respect to block 702 of FIG. 7, a checkpoint replication methodology may include full-object replication and/or delta-checkpoint replication. Therefore, if one or more conditions evaluated by the primary data store to determine if the log-based replication is keeping up indicates that the primary data store is not being sufficiently replicated to the secondary data store by log-based replication, a checkpoint replication process may be implemented to catch up the replication of the primary as well as perform the above optimizations.

In an exemplary embodiment, the method 1000 continues to utilize a checkpoint replication until checkpoints for a partition range have all been considered (e.g., utilized in part) and the primary decides that it wants to go back to log-based replication based upon what it is optimizing for. Further, it is also contemplated that the replication process may revert to a log-based replication once a desired threshold may be maintained of replication throughput utilizing log-based replication.

Figure 11:
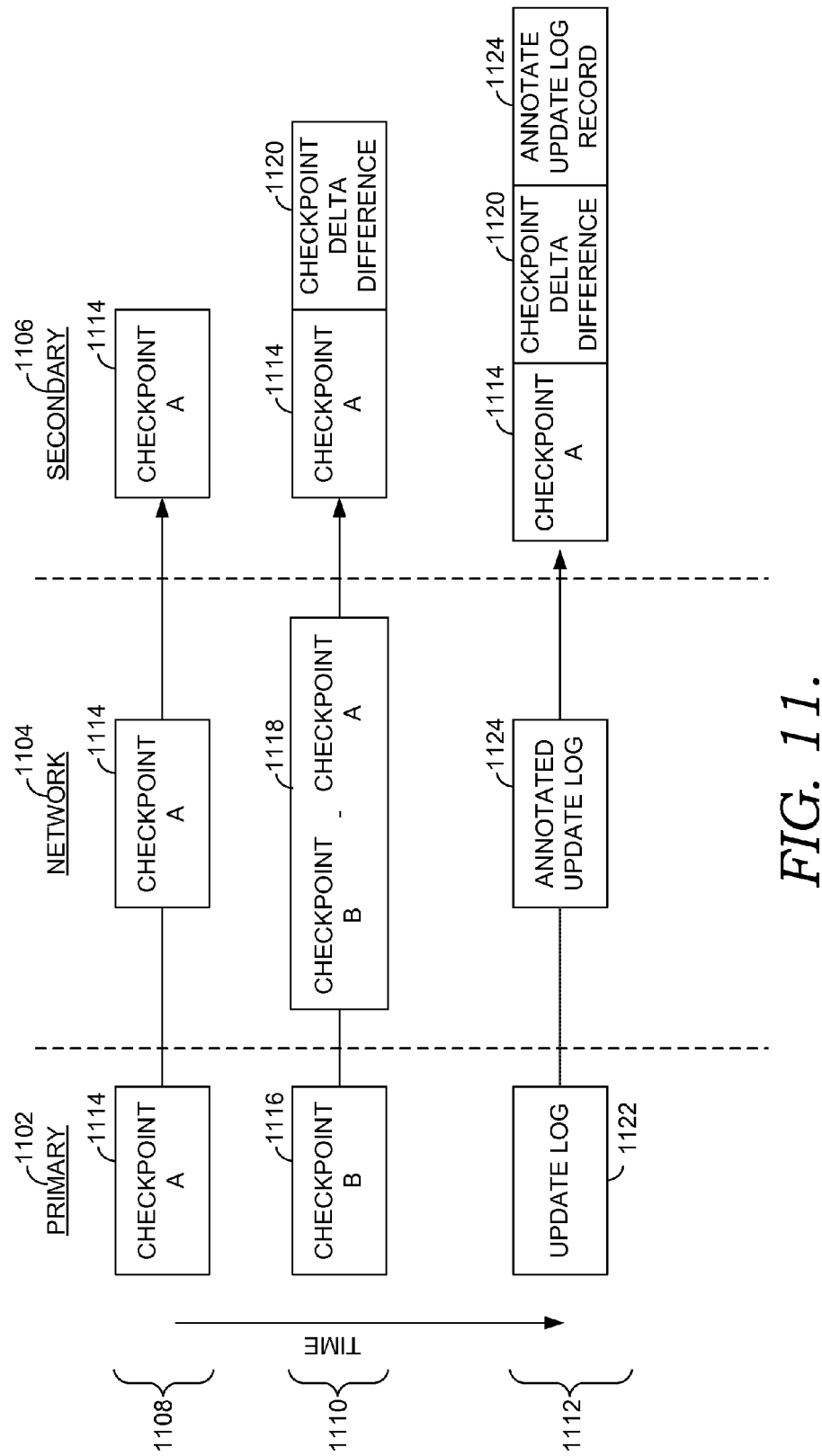
FIG. 11 depicts an exemplary flow of replication data from a primary data store over a network to a secondary data store, in accordance with embodiments of the present invention.

Turning to FIG. 11 that depicts an exemplary flow of replication data from a primary 1102 over a network 1104 to a secondary 1106 as time advances, in accordance with embodiments of the present invention. It is understood that while time is depicted in FIG. 11, a determination to advance from a methodology 1108, to a methodology 1110, to a methodology 1112 may not be dependent on time. Instead, it is contemplated that the transition from one methodology to another methodology is based on determinations to ultimately result in being able to utilize the methodology 1112 (e.g., log-based replication).

The method 1108 visually depicts a full-object replication method where the full state of an object in the checkpoint 1114 is communicated from the primary 1102 to result in the checkpoint 1114 being received at the secondary 1106. In this full-object replication, the complete object (e.g., blob, message, queue, and table) is communicated over the network 1104.

The methodology 1110 may be transitioned to when an initial set of checkpoints have been utilized in a full-object replication. Therefore, the methodology 1110 may represent a delta-checkpoint replication. In this example, a checkpoint B 1116 is identified as having been created at a point in time later than (and in this example sequentially to) the checkpoint A 1114. Therefore, the data communicated from the primary 1102 to the secondary 1106 is a difference in data object from checkpoint B 1116 and the checkpoint A 1114, as depicted as the difference 1118.

Upon receiving the difference 1118, the secondary data store now has data for the checkpoint A 1114 and the checkpoint delta difference 1120, which is the difference between the checkpoint B 1116 and the checkpoint A 1114 in this example.

The methodology 1112 may represent a log-based replication, which may be transitioned to once the checkpoint B 1116 has been replicated (at least in part as a delta difference). The primary 1102 may have been writing data to an update log 1122 since the creation of the checkpoint B 1116. Because a subsequent checkpoint (e.g., a checkpoint C) has yet to be generated, the update log 1122 of the primary 1102 would serve to recreate a state of memory table on the primary if the partition was reloaded. Similarly, the update log 1122 may serve as a source for data when performing a log-based replication. Consequently, an annotated update log record 1124 data is communicated over the network 1104. As previously discussed, records of an update log may be annotated with identifying information. For example, records of a log may be packaged as a geo message that includes a message ID, the transactions epoch #s and sequence #s, and a commit ID, which may be used by the secondary 1106 to commit the data.

Upon receiving the annotated update log record 1124 data, the secondary 1106 may be maintaining the checkpoint A 1114, the checkpoint delta difference 1120, and now the annotated update log record 1124. This combination of data, when committed to the secondary 1106, results in the replication of data that from the primary 1102 to the secondary 1106.

As discussed herein, it is contemplated that various numbers of checkpoints may be identified, merged, or otherwise manipulated with any replication methodology. So, while only a single checkpoint is discussed with respect to a given methodology in FIG. 11, it is understood that multiple checkpoints, logs, or other sources of data may be utilized.

Figure 12:
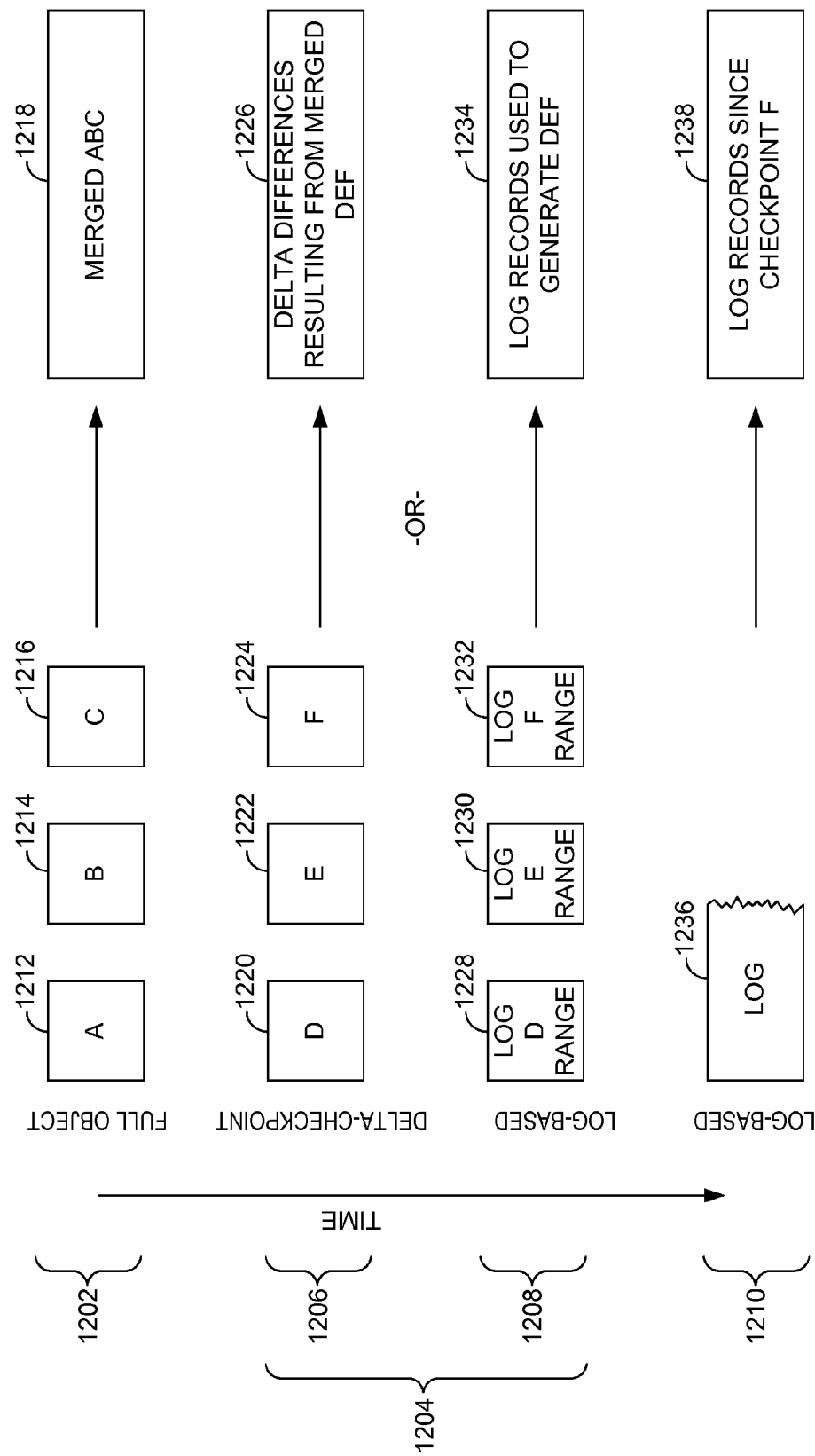
FIG. 12 depicts an exemplary flow of data utilizing a combination of replication methods, in accordance with embodiment of the present invention.

FIG. 12 depicts an exemplary flow of data utilizing a combination of replication methods, in accordance with embodiments of the present invention. The replication process, in this exemplary process is comprised of three portions, a first portion 1202 that utilizes a full-object replication methodology. A second portion 1204 that utilizes either a delta-checkpoint replication methodology 1206 or a log-based replication methodology 1208. The third portion 1210 is a log-based methodology. Again, while a passing of time is illustrated with respect to FIG. 12, it is understood that criteria other than time may be utilized to transition from one method to another.

The first portion 1202 utilizes the full-object replication method, which may start with the exemplary checkpoints 1212, 1214, and 1216 (checkpoints A, B, and C). However, while it has been contemplated that each checkpoint may be replicated independently, a merge operation is performed by a primary data store to result in a merged ABC 1218 grouping of data to be replicated. The merged ABC 1218 may be communicated from a primary to a secondary to initiate the replication of a partition range at the secondary.

The second portion 1204, which may occur later in time from the first portion 1202, may be approached by two different methods. The first method is the delta-checkpoint replication methodology 1206. The delta-checkpoint replication methodology 1206 may be performed when one or more checkpoints have been generated at the primary for the given partition range subsequent to starting the first portion 1202. In this example, checkpoints 1220, 1222, and 1224 were generated at the primary subsequent to initiating the first portion 1202. As such, a merge operation may be performed by the primary on the checkpoints 1220-1224. The changes in the merged checkpoints 1220-1224 may communicated as a delta difference resulting from merged DEF 1226.

The second portion 1204, may in the alternative or in combination, utilize the log-based replication methodology 1208. However, the log-based replication methodology 1208 may need log records covering changes to an object since a previous checkpoint. For example, those records may include a log D range 1228, a log E range 1230, and a log F range 1232. These log records each represent a range within a log that is associated with a checkpoint (e.g., checkpoint D 1220 may be recreated with the log D range 1228). The log records within a particular range of the log may be communicated as log records used to generate DEF 1234. Therefore, a location service, an ACU, or the partition server in general may determine if the second portion 1204 utilizes one or the other independently or in combination to satisfy replication of data from the primary to the secondary.

The third portion 1210 utilizes, in an exemplary embodiment, the log-based methodology only. Once it has been determined that additional checkpoints for a given partition range have not be generated, a log 1236 (e.g., an update log) may be replicated to the secondary. The log 1236 may be communicated as log records generated since checkpointing the checkpoint F 1238, in this example.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention. While certain methodologies have been described in a particular sequence, it is contemplated that those activities may be performed in a variety of order and sequences.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A computer-implemented method in a distributed storage environment utilizing a processor and memory for replicating data utilizing a combination of replication processes in the distributed computing environment, the method comprising:
   identifying a first one or more checkpoints that describes complete contents of an object for a data partition range at a primary data store, wherein the data partition range maintains the object;
   initiating replicating the first one or more checkpoints to the secondary data store utilizing a full-object replication process that replicates the complete contents of the object from the first one or more checkpoints to the secondary data store;
   identifying a second one or more checkpoints for the data partition range at the primary data store;
   initiating replicating the second one or more checkpoints to the secondary data store utilizing a delta-checkpoint replication process that updates the complete contents of the object at the secondary data store with changes made to the object at the primary data store after the full-object replication process; and
   initiating replicating data from the data partition range at the primary data store to the secondary data store utilizing a log-based replication process.

2. The method of claim 1, wherein the first one or more checkpoints is comprised of at least two checkpoints of data maintained within the data partition range.

3. The method of claim 2 further comprising merging the at least two checkpoints of the first one or more checkpoints into a merged checkpoint;
   wherein the initiating replicating of the first one or more checkpoints to the secondary data store includes the primary data store communicating the merged checkpoint to the secondary data store.

4. The method of claim 1, wherein the data partition range represents a range of data unique to an account.

5. The method of claim 1, wherein the secondary data store is in a different geographical location than the primary data store.

6. The method of claim 1, wherein the first one or more checkpoints is a snapshot of a state of the data partition range prior to the initiating replicating the first one or more checkpoints to the secondary data store utilizing the full-object replication process.

7. The method of claim 1, wherein the second one or more checkpoints are created at the primary data store after identifying the first one or more checkpoints.

8. The method of claim 7, wherein the second one or more checkpoints are identified after starting the replication of the first one or more checkpoints to the secondary.

9. The method of claim 1, wherein the delta-checkpoint replication process does not communicate the entire state of an object.

10. The method of claim 1, wherein the delta-checkpointing process communicates from the primary data store to the secondary data store changes to an object that occurred at the primary data store since the first one or more checkpoints were generated.

11. The method of claim 1 further comprising prior to utilizing the log-based replication process, determining the data partition range does not have an associated checkpoint that was generated after the second one or more checkpoints were identified.

12. The method of claim 1, wherein the log-based replication process communicates data from a log of the primary data store to the secondary data store, the data from the log is data that has not been replicated using the checkpoint-based approach prior to communicating from the primary data store to the secondary data store.

13. One or more computer storage media having computer-executable instructions embodied thereon, that when executed by a computing system having a processor and memory, cause the computing system to perform a method for replicating data in a distributed computing environment utilizing a plurality of replication processes, the method comprising:

initiating replicating data from a primary data store to a secondary data store utilizing a log-based replication process, wherein the data is maintained in a log of the primary data store;

determining the log-based replication process is performing below a predefined threshold of replication throughput from the primary data store to the secondary data store; and in response to determining the log-based replication process is below the predefined threshold, switching from the log-based replication process for replicating data from the primary data store to the secondary data store to a checkpoint replication process.

14. The media of claim 13, wherein the data is maintained within a data partition range of the primary data store.

15. The media of claim 13, wherein the log-based replication processes is utilized to replicate data from the primary data store to the secondary data store unless an amount of the data in the log exceeds the predefined threshold.

16. The media of claim 13, wherein the data is annotated with information as part of the log-based replication process, wherein the information facilitates committing the data at the secondary data store.

17. The media of claim 13, wherein the determining the log-based replication process is performing below a predefined threshold of replication throughput is determined when the log-based replication process is replicating the data at a rate that is less than data is being written to a log of the primary data store.

18. The media of claim 13, wherein the method further comprises writing the data to a buffer.

19. The media of claim 13, wherein the checkpoint replication process is comprised of a full-object replication process or a delta-checkpoint replication process.

20. One or more computer storage media having computer-executable instructions embodied thereon, that when executed by a computing system having a processor and memory, cause the computing system to perform a method for replicating data in a distributed computing environment utilizing a plurality of replication processes, the method comprising:

replicating a first data of a first object from a primary data store to a secondary data store utilizing a full-object replication process based on a first checkpoint that describes contents of the first object, wherein the full-object replication replicates complete contents of the first object;

replicating a second data of the first object from the primary data store to the secondary data store utilizing a delta-checkpoint replication process based on a second checkpoint that describes changes made to the first object at the primary data store, wherein the delta-checkpoint replication process replicates delta differences of the first object that are determined from the changes described by the second checkpoint to the secondary data store, wherein the second checkpoint was generated after the full-object replication process initiated replicating the first data; and replicating a third data of the first object from the primary data store to the secondary data store utilizing a log-based replication process, wherein the log-based replication process replicates the third data from a log of the primary data store, wherein the third data is not maintained in the first checkpoint or the second checkpoint.

* * * * *